(12) United States Patent
Tanonaka et al.

(10) Patent No.: US 6,173,023 B1
(45) Date of Patent: Jan. 9, 2001

(54) SYNCHRONIZATION EQUIPMENT

(75) Inventors: Koji Tanonaka; Naoto Kidoku; Toshikazu Magome, all of Kawasaki; Hiroyuki Suzuki, Yokohama, all of (JP)

(73) Assignee: Fujitsu Limited, Kawasaki (JP)

( * ) Notice: Under 35 U.S.C. 154(b), the term of this patent shall be extended for 0 days.

(21) Appl. No.: 09/038,321

(22) Filed: Mar. 11, 1998

(30) Foreign Application Priority Data

Oct. 20, 1997 (JP) .................................................. 9-287234

(51) Int. Cl.[7] ...................................................... H04L 7/00
(52) U.S. Cl. ............................................ 375/357; 375/354
(58) Field of Search ............................. 375/357, 354, 375/356, 355; 340/825.14, 825.2; 370/350, 304

(56) References Cited

U.S. PATENT DOCUMENTS

| | | | | |
|---|---|---|---|---|
| 5,327,402 | * | 7/1994 | Shinomiya | 368/46 |
| 5,473,640 | * | 12/1995 | Bortolini | 375/376 |
| 5,682,408 | * | 10/1997 | Tanonaka | 375/354 |
| 5,687,015 | * | 11/1997 | Abe | 359/161 |
| 5,956,347 | * | 9/1999 | Slater | 370/503 |

FOREIGN PATENT DOCUMENTS

| | | |
|---|---|---|
| 1-231450 | 9/1989 | (JP) . |
| 09064842 | 3/1997 | (JP) . |

* cited by examiner

*Primary Examiner*—Chi H. Pham
*Assistant Examiner*—Khai Tran
(74) *Attorney, Agent, or Firm*—Helfgott & Karas, P.C.

(57) ABSTRACT

The invention concerns synchronization equipment; more particularly, the invention is directed to the provision of synchronization equipment which, after simple hardware installation and software setting, establishes a synchronization network with an existing network, SDH elements, etc. that do not support SSMB. The synchronization equipment comprises: a failure detection section for detecting a failure of each of a plurality of timing sources assigned prescribed priorities; a failure monitoring section for monitoring failure detection information from the failure detection section, and for outputting in the event of detection of a timing source failure a timing source switching control signal directing switching to a timing source having the highest priority among the timing sources other than the failure-detected timing source; a timing source selection section for outputting a timing source switching control signal based on the quality of synchronization derived from SSMB information; and a selection section for selecting one or the other of the two timing source switching control signals.

12 Claims, 21 Drawing Sheets

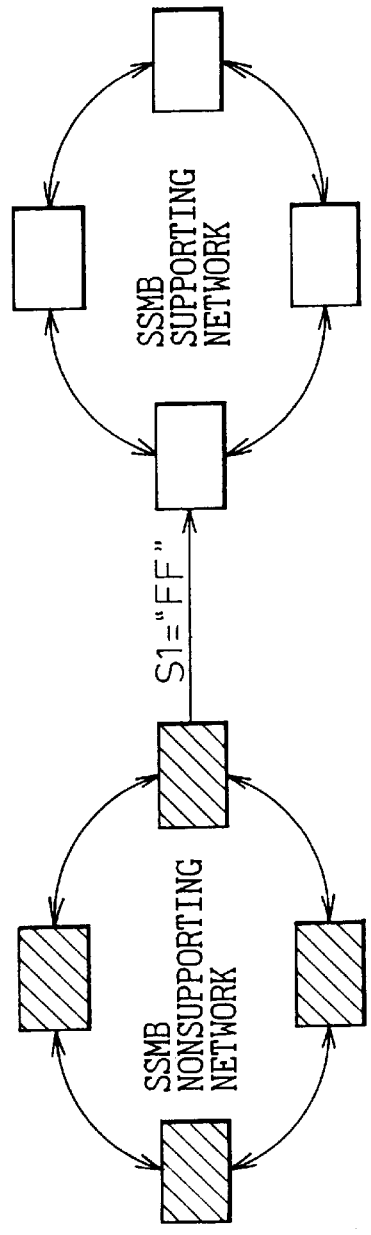
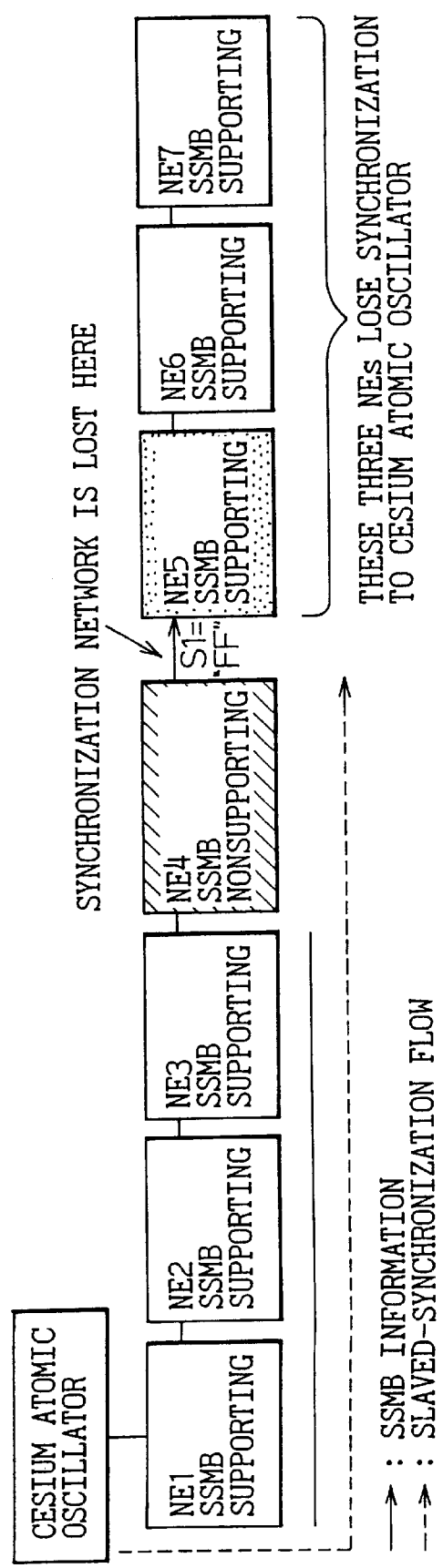
Fig.2A PRIOR ART
Fig.2B PRIOR ART

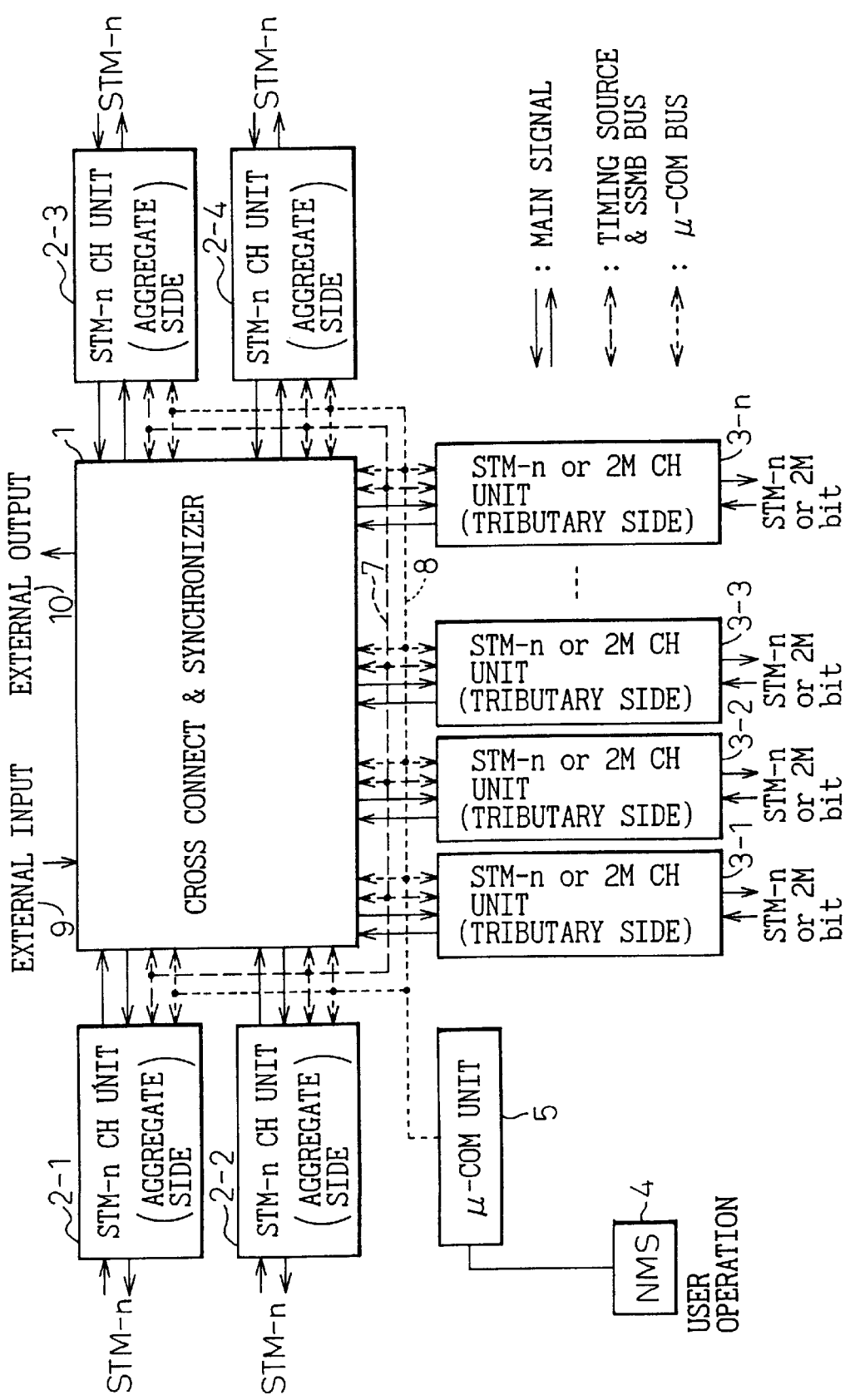

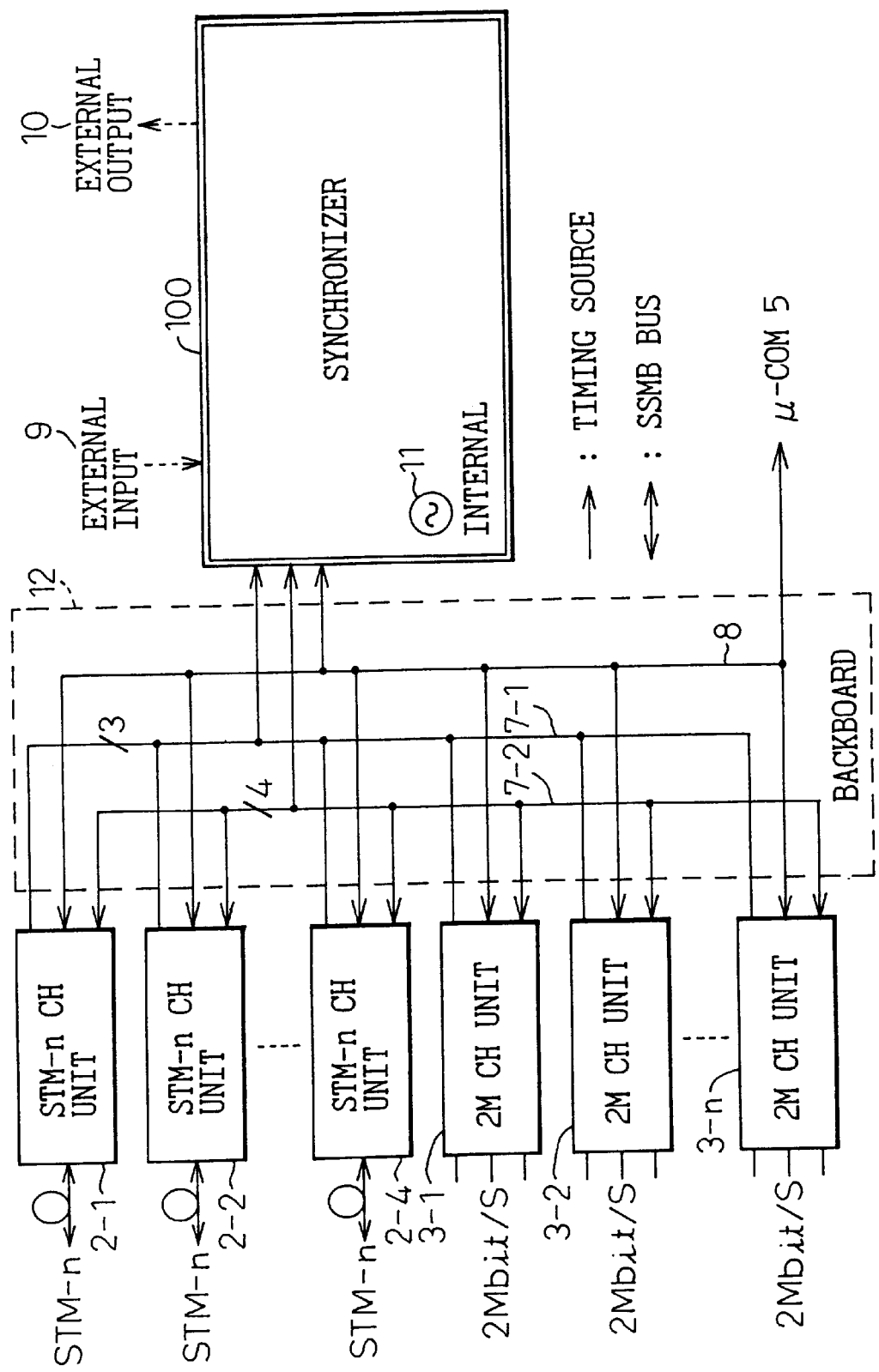

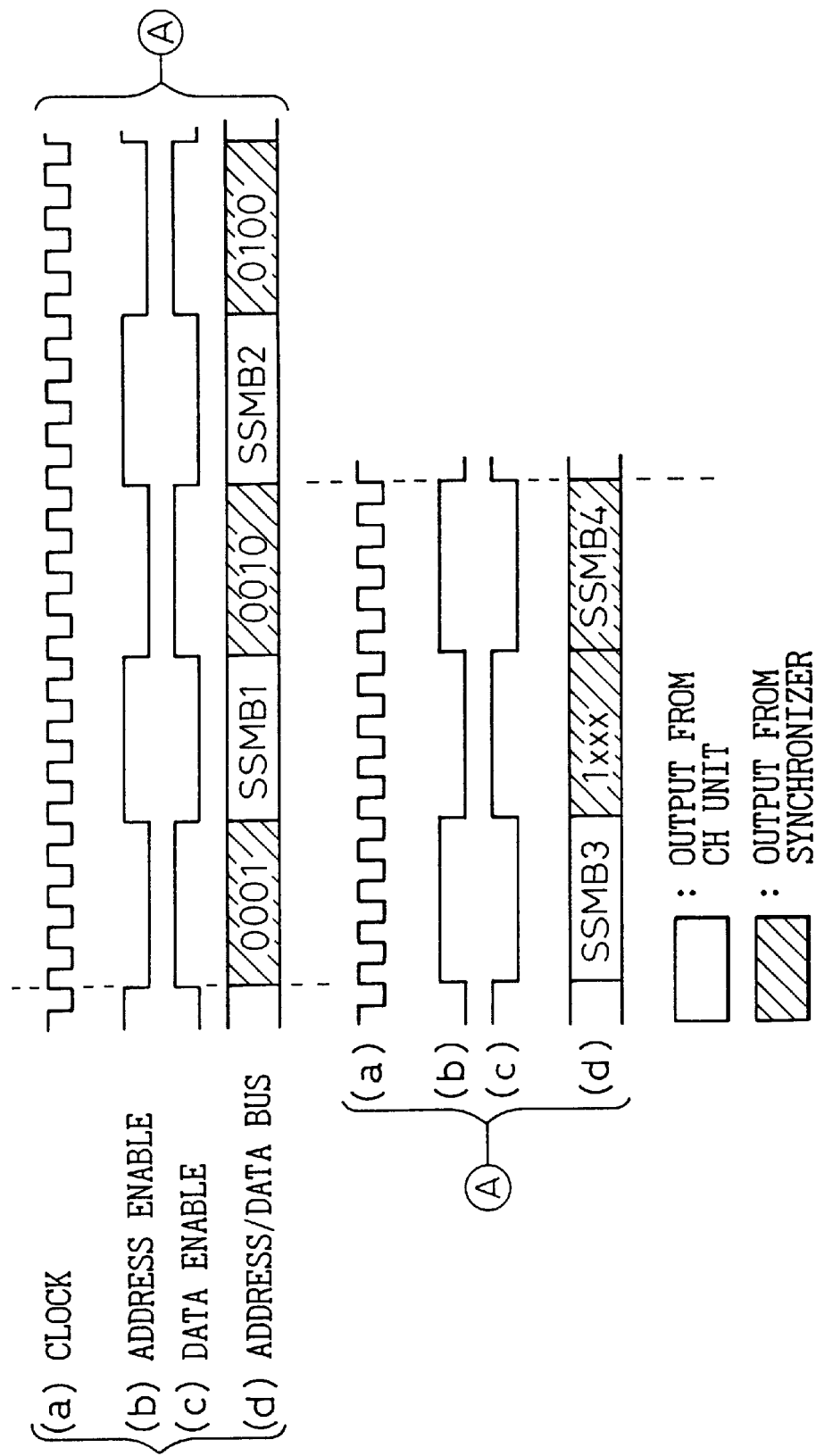

Fig.6

| PRIORITY | ADDRESS VALUE |
|----------|---------------|
| 1 | X001 |
| 2 | X010 |
| 3 | X100 |

X: MSB OF ADDRESS VALUE INDICATES TRANSMISSION DIRECTION OF NEXT SSMB DATA ON ADDRESS/DATA BUS

MSB OF ADDRESS VALUE IS "0"
: CH UNIT OUTPUTS SSMB VALUE OF RECEIVED S1 BYTE

MSB OF ADDRESS VALUE IS "1"
: SYNCHRONIZER OUTPUTS SSMB VALUE OF CURRENTLY SELECTED TIMING SOURCE

Fig.7 PRIOR ART

| SSMB CODE | MEANING | SSMB CODE | MEANING |
|-----------|---------|-----------|---------|
| 0000 | QUALITY UNKNOWN | 1000 | G.812 LOCAL |
| 0001 | RESERVED | 1001 | RESERVED |
| 0010 | G.811 | 1010 | RESERVED |
| 0011 | RESERVED | 1011 | SETS |
| 0100 | G.812 TRANSIT | 1100 | RESERVED |
| 0101 | RESERVED | 1101 | RESERVED |
| 0110 | RESERVED | 1110 | RESERVED |
| 0111 | RESERVED | 1111 | DON'T USE FOR SYNC |

Fig.8

| ADDRESS VALUE OF REGISTER | TABLE STORED IN SYNCHRONIZER | | | | VALUE SET FROM μ-COM ③ | | | | CONVERTED QUALITY VALUE |
|---|---|---|---|---|---|---|---|---|---|
| 00(h) | 0 | 0 | 0 | 0 | 0 | 0 | 1 | 0 | 2 |
| 01(h) | 0 | 0 | 0 | 1 | 0 | 1 | 1 | 0 | 6 |
| 02(h) | 0 | 0 | 1 | 0 | 0 | 0 | 1 | 0 | 2 |
| 03(h) | 0 | 0 | 1 | 1 | 0 | 1 | 1 | 0 | 6 |
| 04(h) | 0 | 1 | 0 | 0 | 0 | 0 | 1 | 1 | 3 |
| 05(h) | 0 | 1 | 0 | 1 | 0 | 1 | 1 | 0 | 6 |
| 06(h) | 0 | 1 | 1 | 0 | 0 | 1 | 1 | 0 | 6 |
| 07(h) | 0 | 1 | 1 | 1 | 0 | 1 | 1 | 0 | 6 |
| 08(h) | 1 | 0 | 0 | 0 | 0 | 1 | 0 | 0 | 4 |
| 09(h) | 1 | 0 | 0 | 1 | 0 | 1 | 1 | 0 | 6 |
| 0A(h) | 1 | 0 | 1 | 0 | 0 | 1 | 1 | 0 | 6 |
| 0B(h) | 1 | 0 | 1 | 1 | 0 | 1 | 0 | 1 | 5 |
| 0C(h) | 1 | 1 | 0 | 0 | 0 | 1 | 1 | 0 | 6 |
| 0D(h) | 1 | 1 | 0 | 1 | 0 | 1 | 1 | 0 | 6 |
| 0E(h) | 1 | 1 | 1 | 0 | 0 | 1 | 1 | 0 | 6 |
| 0F(h) | 1 | 1 | 1 | 1 | 0 | 1 | 1 | 0 | 6 |

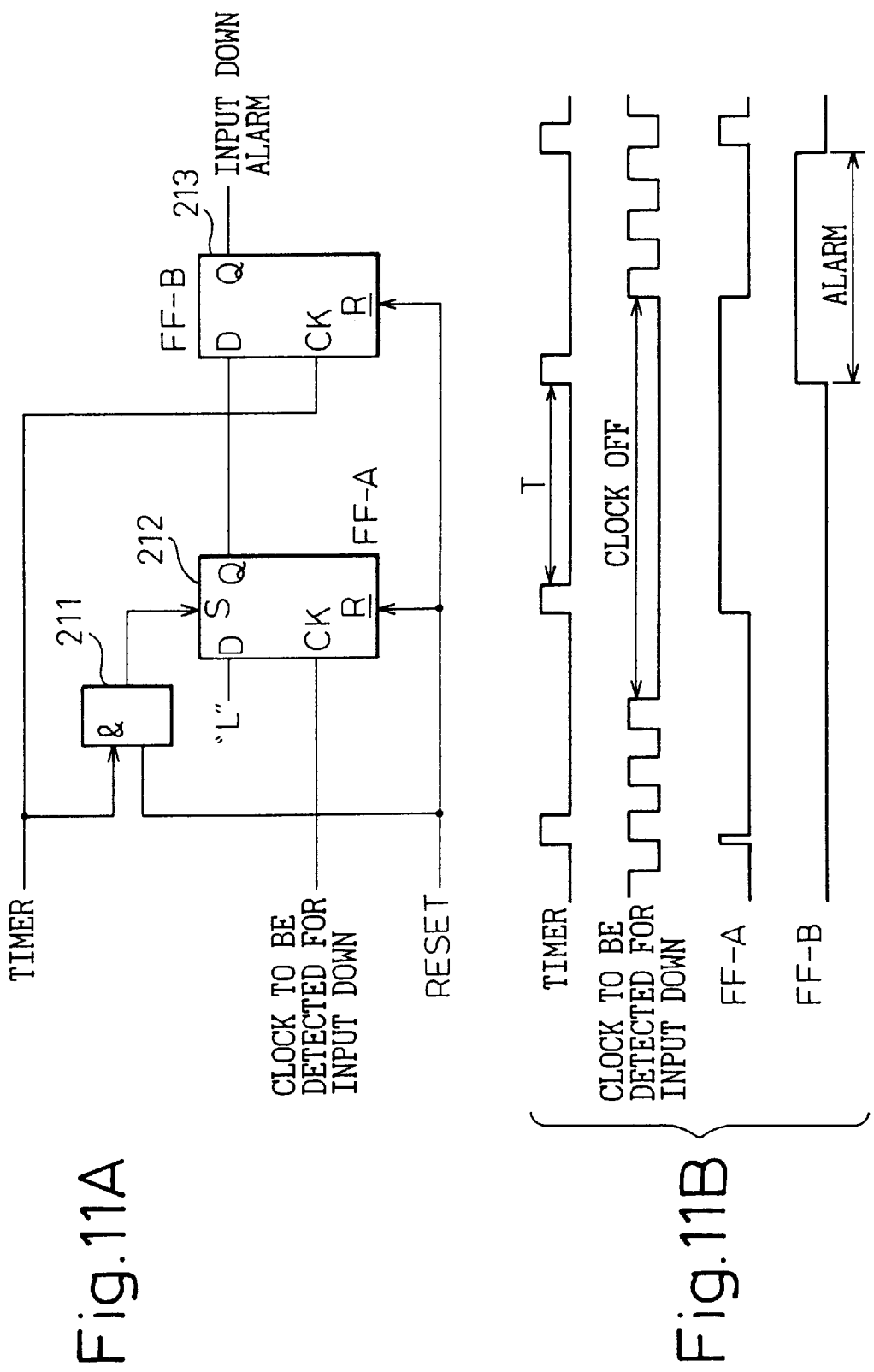

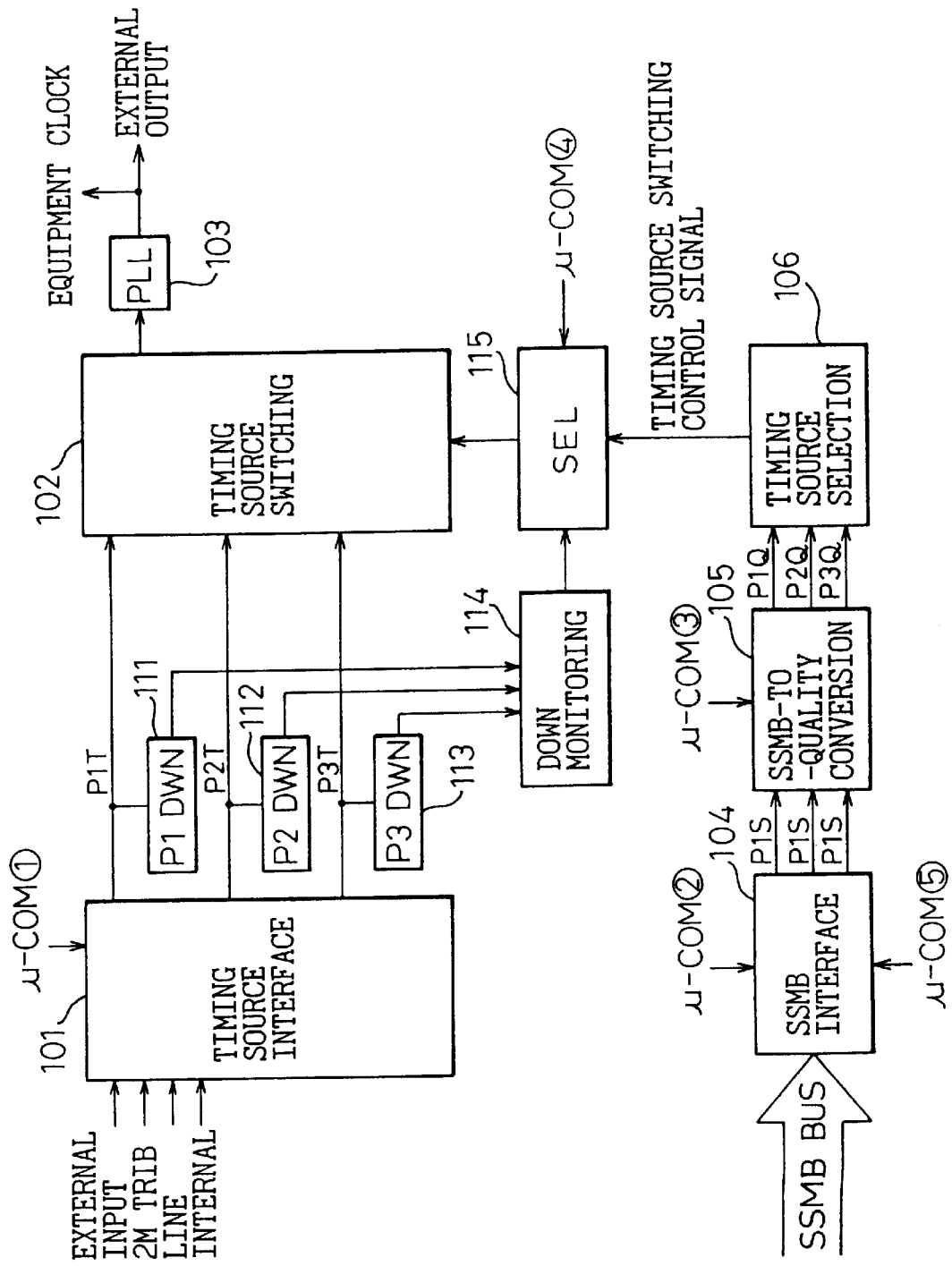

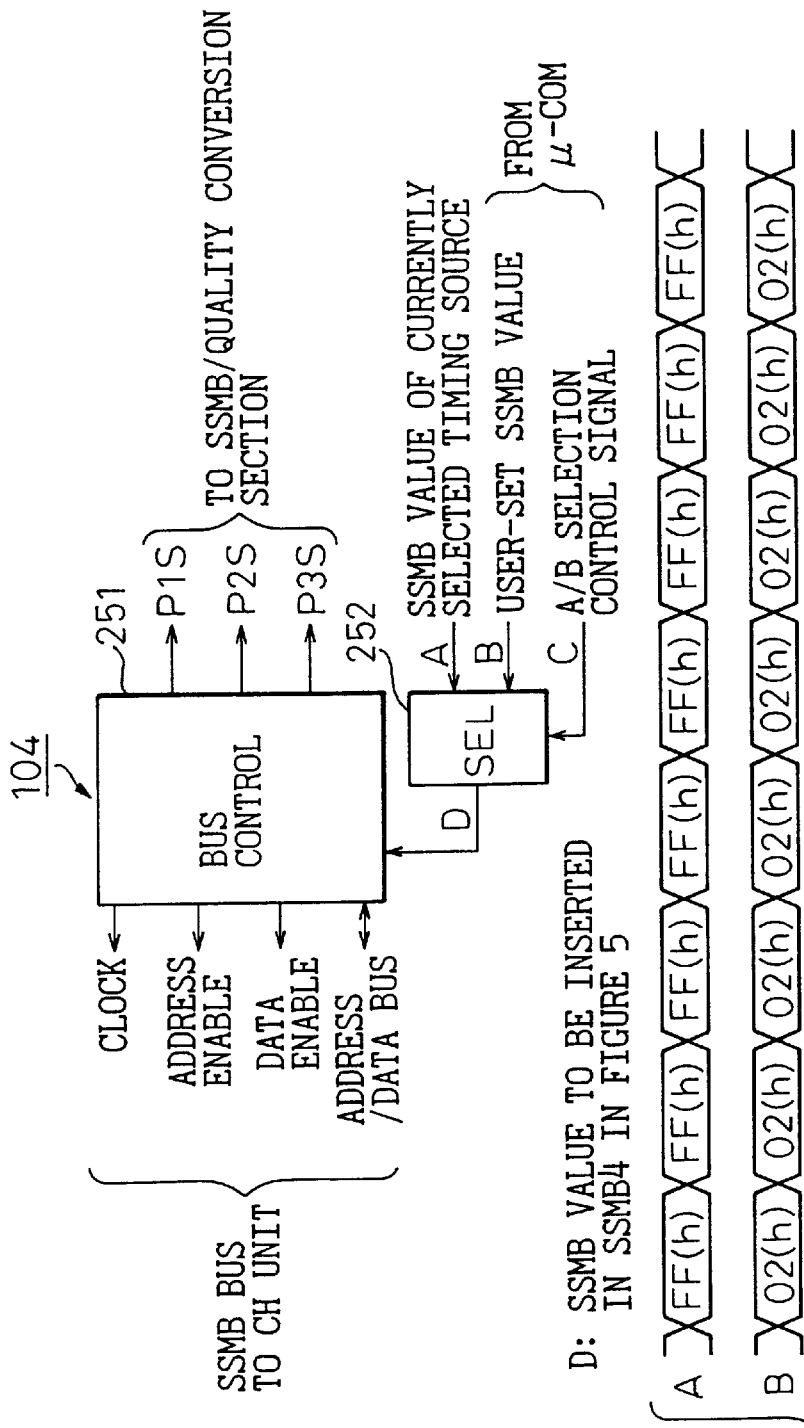

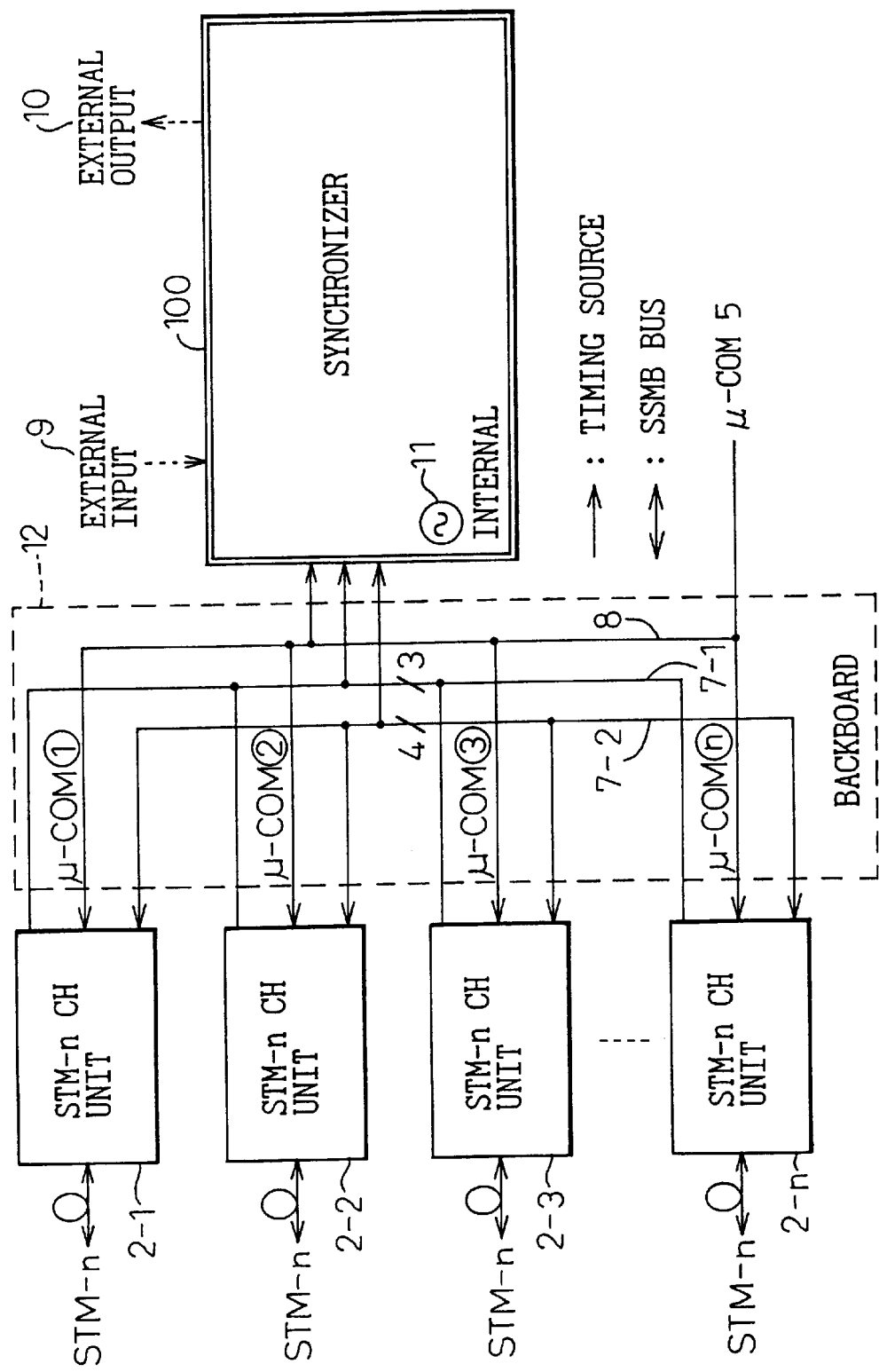

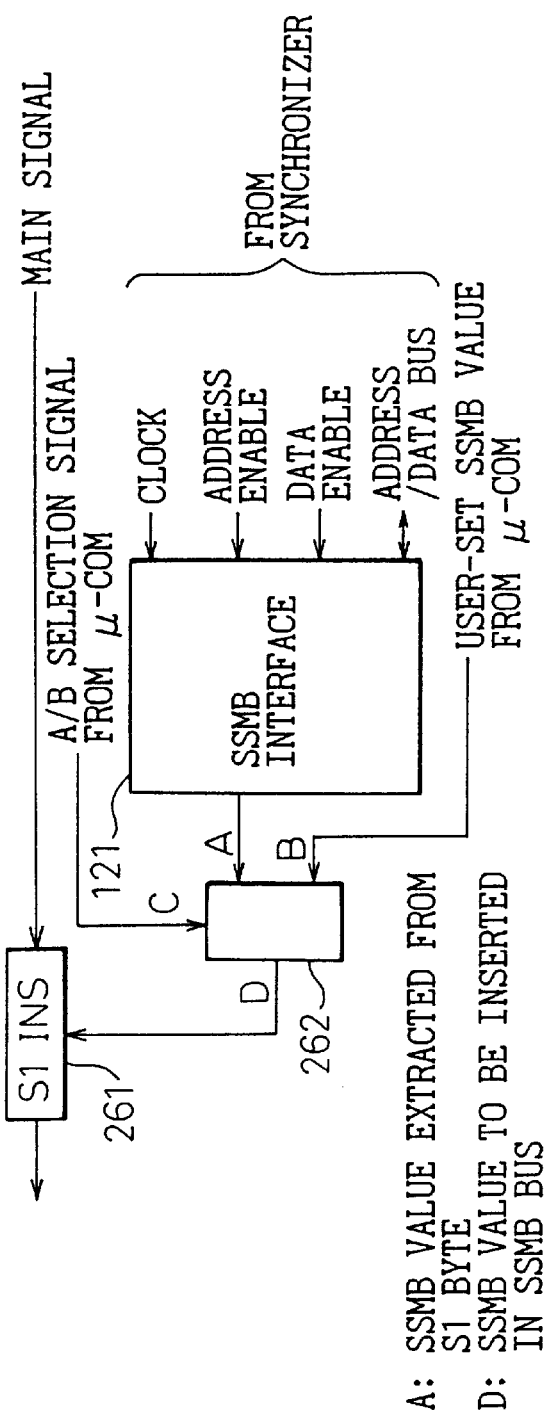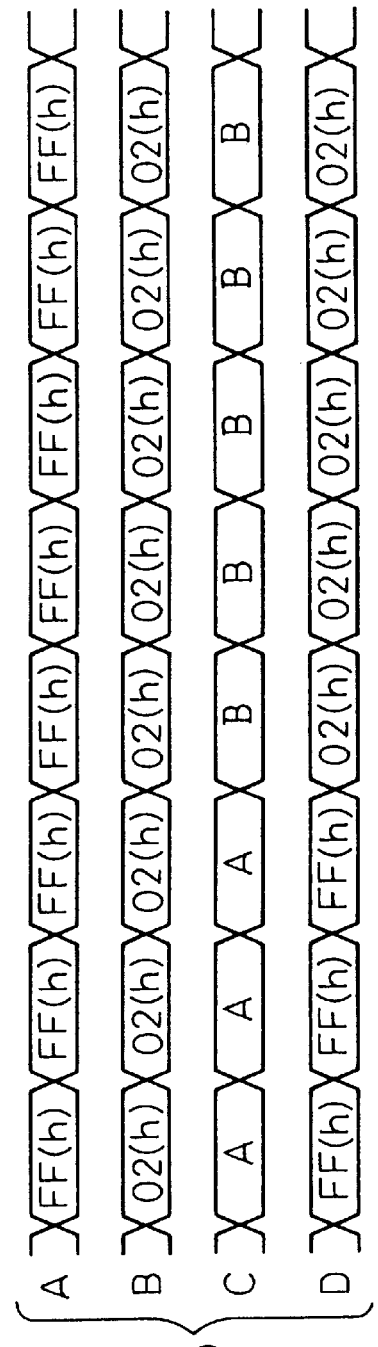
Fig.22A
Fig.22B ated, for output, the timing source selected by the timing source switching section or the timing source selected by the timing source selection section.

SYNCHRONIZATION EQUIPMENT

BACKGROUND OF THE INVENTION

1. Field of the Invention

The present invention relates to synchronization equipment, and more particularly to synchronization equipment which, after simple hardware installation and software setting, establishes a synchronization network with an existing network and SDH (Synchronous Digital Hierarchy) elements, etc. that do not support SSMB (Synchronization Status Message Half Byte).

2. Description of the Related Art

In recent years, SDH elements that use an SSMB signal to switch from one timing source to another for network synchronization have been increasing in number. The SSMB signal is transmitted using the low-order four bits of the S1 byte (formerly Z1 #1 byte) carried in the multiplex section overhead (MSOH) of an STM-n (Synchronous Transfer Mode-n) signal.

As shown in FIG. 7, described subsequently, the SSMB information itself is defined in the binary code table of ITU-T G.708, where four-bit signals, in various combinations of four bits, are each defined in relation to SDH synchronization quality. For example, "0010 (02h)" indicates the synchronization quality equivalent to G.811 (primary timing source using a cesium atomic oscillator), and "1111" is defined as "Don't use for sync."

FIGS. 1A to 1C show an operational example of a network that supports SSMB.

In FIG. 1A, network element 1 (NE1) sets priority 1 for an external clock input (External Input) and priority 2 for an input line 2 (Line 2). Further, network element 2 (NE2) sets priority 1 for an input line 1 (Line 1) and priority 2 for an input line 4 (Line 4). Similarly, network element 3 (NE3) sets priority 1 for an input line 3 (Line 3) and priority 2 for an external clock input (External input). In the initial state, the network elements 1, 2, and 3 are each set to select the priority 1 side.

The network element 1 is connected to a primary synchronization clock generator (Primary Clock) constructed from a cesium atomic oscillator, and sends the SSMB value "02h", representing the synchronization quality based on the primary clock, to its downstream network element 2 as the S1 byte signal in the STM multiplex section overhead on Line 1. Likewise, the network element 2 sends the SSMB value "02h" to the network element 3 as the S1 byte signal in the STM multiplex section overhead on Line 3. Here, the SSMB value of Lines 2 and 4 is set to "0Fh" to prevent a timing loop. In this way, the network elements 1, 2, and 3 are slave-synchronized to the primary synchronization clock signal from the primary synchronization clock generator.

Next, if a failure occurs in the primary synchronization clock generator or on its output line, as shown in FIG. 1B, the network element 1 is put in a holdover state and remains in that state. With this change in the synchronization quality, the network element 1 changes the SSMB value from "02h" to "0Bh" (SETS—Synchronization Equipment Timing Source), and sends the SSMB value to its downstream network element 2 via Line 1. The network element 2 sends the same SSMB value "0Bh" to its downstream network element 3 via Line 3. As a result, the entire network is synchronized to the holdover of the network element 1.

In FIG. 1C, the network element 3 compares the synchronization quality (SSMB value "0Bh") on Line 3 of priority 1 with the synchronization quality (SSMB value "04h") of the clock being applied at the external clock input (External Input) of priority 2 from a secondary synchronization clock generator (Secondary Clock) constructed from a rubidium atomic oscillator, selects the priority 2 side providing the better equality, and sends the SSMB value "04h" to the network element 2 via Line 4. The network element 2 performs a similar comparison to select the better quality priority 2 side, and sends the SSMB value "04h" to the network element 1 via Line 2.

Next, the network element 1 selects the priority 2 side providing the higher synchronization quality than its own holdover. As a result, the network elements 1, 2, and 3 are now slave-synchronized to the secondary synchronization clock signal from the secondary synchronization clock generator. Further, the SSMB value of Lines 1 and 2 is changed to "0Fh" to prevent a timing loop.

FIGS. 2A and 2B show an example of an environment where a network and SDH elements that support SSMB coexist with an existing network and SDH elements that do not support SSMB.

As shown in FIGS. 2A and 2B, in the existing SSMB non-supporting network and SDH elements (indicated by oblique hatching), "1111" indicating a not-used state is often set in the S1 byte. Accordingly, in the SSMB supporting network and SDH elements (indicated by dots) that are slaved to them, a decision is made that the timing source cannot be used ("Don't use for sync."). As a result, there has been the problem that synchronization cannot be established successfully for the SSMB supporting network and SDH elements slaved to the SSMB non-supporting network and SDH elements.

SUMMARY OF THE INVENTION

In view of the above-described problem, it is an object of the present invention to provide synchronization equipment which, after simple hardware installation and software setting, can establish synchronization between an SSMB supporting network and SDH elements and an existing SSMB non-supporting network and SDH elements in an environment where such networks and elements are mixed.

According to the present invention, there is provided synchronization equipment comprising: a timing source interface section for interfacing with multiple kinds of timing sources; a timing source switching section for outputting one timing source by switching its input between a plurality of timing sources which have been selected in the timing source interface section and assigned prescribed priority; a PLL section for generating an equipment clock by synchronizing to the timing source selected and output from the timing source switching section; a failure detection section for detecting a failure of each of the plurality of timing sources assigned the prescribed priority; a failure monitoring section for monitoring failure detection information from the failure detection section, and for outputting in the event of detection of a timing source failure a timing source switching control signal directing switching to a timing source having the highest priority among the timing sources other than the failure-detected timing source; an SSMB interface section for interfacing with an SSMB bus; an SSMB-to-quality conversion section for converting SSMB information supplied from the SSMB interface section into corresponding synchronization quality information; a timing source selection section for outputting a timing source switching control signal based on the synchronization quality information supplied from the SSMB-to-quality conversion section; and a selection section for selecting either the timing source switching control signal from the failure monitoring section or the timing source switching control signal from the timing source selection section in accordance with an instruction from prescribed selection instruction means. The prescribed selection instruction means is an equipment controller that controls equipment operation, or is constructed from a manually operated switch mechanism.

According to the present invention, there is also provided synchronization equipment comprising: a synchronizer for performing synchronization control; and an STM-n channel unit, connected to a transmission line, for communicating SSMB information with the synchronizer, and wherein: an SSMB value to be sent to the STM-n channel unit from the synchronizer is set by an equipment controller controlling equipment operation, thereby enabling the STM-n channel unit to send an arbitrary SSMB value out onto the transmission line.

According to the present invention, there is also provided synchronization equipment, wherein, instead of setting the SSMB value, to be sent to the STM-n channel unit from the synchronizer, by the equipment controller controlling equipment operation, the SSMB value to be sent out from the STM-n channel unit that is outputting the SSMB information onto the transmission line is set by the equipment controller, thereby enabling the STM-n channel unit to send an arbitrary SSMB value out onto the transmission line.

According to the present invention, there is also provided synchronization equipment wherein the SSMB information to be sent from the channel unit to the synchronizer is set by the equipment controller controlling equipment operation, thereby performing the timing source switching control.

BRIEF DESCRIPTION OF THE DRAWINGS

The present invention will be more clearly understood from the description as set forth below with reference to the accompanying drawings.

FIG. 2A is a diagram showing an example of an environment where a network and SDH elements that support SSMB coexist with an existing network and SDH elements that do not support SSMB;

FIG. 2B is a diagram showing another example of an environment where a network and SDH elements that support SSMB coexist with an existing network and SDH elements that do not support SSMB;

FIG. 3 is a diagram showing the general configuration of synchronization equipment according to the present invention;

FIG. 4 is a diagram showing an interconnection example for a synchronization system;

FIG. 5 is a diagram depicting signals on SSMB bus lines in concrete form;

FIG. 6 is a diagram showing one example of an priority/address mapping table;

FIG. 7 is a diagram showing an SSMB code/bit assignment table;

FIG. 8 is a diagram showing one example of an SSMB value quality list;

FIG. 11A is a diagram showing one example of the circuit configuration of a failure detection section;

FIG. 11B is a timing chart for FIG. 11A;

FIG. 19 is a diagram showing a fifth embodiment of the synchronization equipment according to the present invention;

FIG. 20A is a diagram showing an example of the circuit configuration of an SSMB interface section at the synchronizer side that implements the fifth embodiment;

FIG. 20B is a timing chart for FIG. 20A;

FIG. 21 is a diagram showing a sixth embodiment of the synchronization equipment according to the present invention;

FIG. 22A is a diagram showing an example of the circuit configuration of an SSMB interface section at the STM-n channel unit side that implements the sixth embodiment; and FIG. 22B is a timing chart for FIG. 22A.

DESCRIPTION OF THE PREFERRED EMBODIMENTS

Figure 1A:
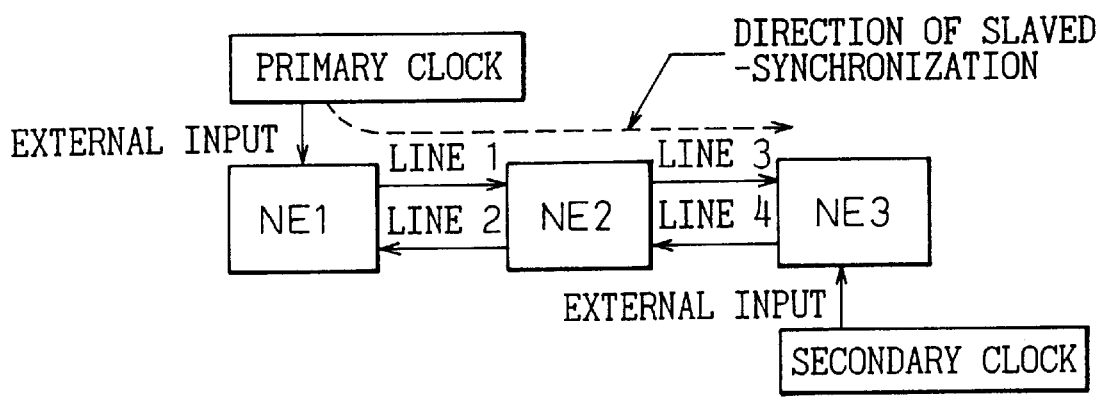
FIG. 1A is a diagram showing an operational example (1) of a network that supports SSMB.
Figure 1B:
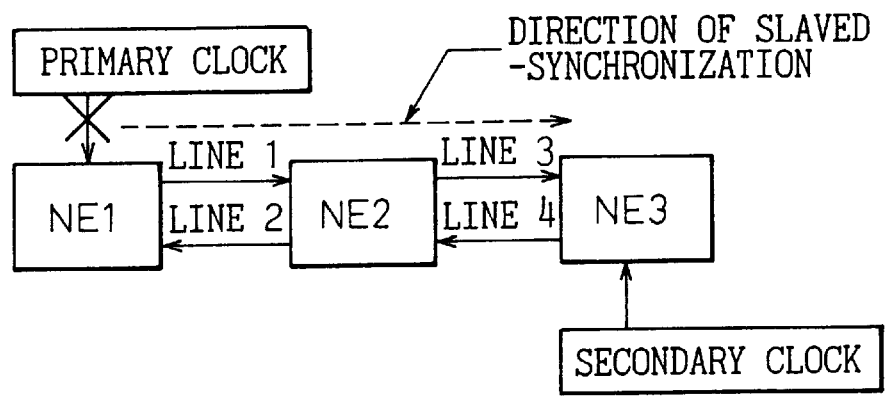
FIG. 1B is a diagram showing an operational example (2) of a network that supports SSMB.
Figure 1C:
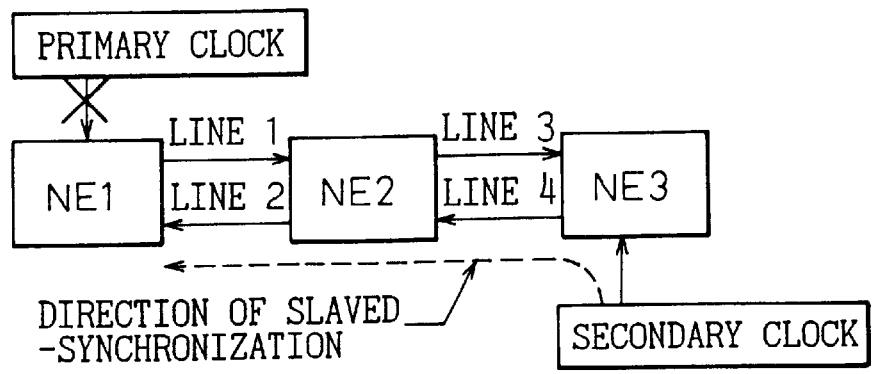
FIG. 1C is a diagram showing an operational example (3) of a network that supports SSMB.

FIG. 3 shows the general configuration of synchronization equipment according to the present invention.

In FIG. 3, a cross connect & synchronizer section 1 consists of a cross connect that performs main signal path switching using an insert/drop function and a synchronizer that establishes network synchronization. To the cross connect & synchronizer section 1 are connected a plurality of STM-n channel units 2-1 to 2-4 on the aggregate side and a plurality of STM-n or existing 2 M channel units 2-1 to 3-n on the tributary side.

A network management system (NMS) 4 is one that allows the user to make settings for maintenance, management, and other operations of the network and equipment. A microcomputer unit 5 connected to NMS 4 makes settings for the cross connect & synchronizer section 1 and the STM-n channel units and existing 2 M channel units, 2-1 to 2-4 and 2-1 to 3-n, in accordance with instructions from the NMS 4.

The STM-n channel units and existing 2M channel units, 2-1 to 2-4 and 2-1 to 3-n, and the cross connect & synchronizer section 1 are interconnected via bidirectional main signal lines, and all of these devices are connected to a microcomputer bus (μ-COM BUS) 8 of the microcomputer unit 5. They are also connected to a timing source & SSMB bus 7. An external timing source is input via an external input 9. The cross connect & synchronizer section 1 may be divided between the cross connect and the synchronizer as separate entities.

FIG. 4 shows an interconnection example for the synchronization system in the synchronization equipment of FIG. 3. The example shows interconnections between the synchronizer 100 in the cross connect & synchronizer section 1 and the respective channel units.

In FIG. 4, the respective synchronization units of the synchronization equipment are interconnected via the three timing source lines 7-1 and four SSMB bus lines 7-2 wired on a backboard 12. Likewise, the μ-COM bus line 8 from the microcomputer unit 5 is connected to each unit via the backboard 12. The bus width of the μ-COM bus line 8 depends on the microcomputer used.

Four kinds of timing sources are provided, which are labeled External Input, 2 M Trib, STM-n (Line), and Internal, respectively. The external input 9 has four ports, i.e., 2 M bit/s (X), 2 M bit/s (Y), 2 MHz (X), and 2 MHz (Y), and is supplied directly to the synchronizer 100. The timing input (2 M Trib) from the 2 M channel units 3-1 to 3-n has three ports per channel unit. The timing input (Line) from the STM-n channel units 2-1 to 2-4 has one port per channel unit. The input (Internal) from a fixed oscillator 11 internal to the synchronizer has one port.

Timing source is sent to the synchronizer 100 only from the channel units selected by user setting. The three timing source lines 7-1 on the backboard 12 consist of lines of priority 1 (P1), priority 2 (P2), and priority 3 (P3) that are run in a bus structure, and only the channel units for which priority is set by the user output timing source signals on their corresponding lines.

For SSMB information also, only the channel units for which priority is set by the user communicate with the synchronizer via the four SSMB bus lines 7-2 on the backboard 12. In this case, each of the STM-n channel units 2-1 to 2-4 extracts the S1 byte from the multiplex section overhead of the STM-n signal received from the STM signal line and sends the extracted SSMB information to the synchronizer 100.

Further, the 2 M channel units 3-1 to 3-n and the external input 9 each send a user-set SSMB value to the synchronizer 100, since they do not receive SSMB information from the outside. On the other hand, the synchronizer 100 sends the SSMB value of the currently selected timing source to the STM-n channel units 2-1 to 2-4, via which the synchronization quality of the timing source to which the synchronization equipment is synchronized is reported to other network and SDH elements.

FIG. 5 is a diagram depicting signals on the four SSMB bus lines in concrete form.

FIG. 6 is a diagram showing one example of a priority/address mapping table.

As shown in FIG. 5, the SSMB bus lines consists of clock, address enable, data enable, and address/data bus signal lines.

A slow clock of about 300 KHz is used for the clock signal, and the clock signal is supplied to each channel unit from the synchronizer 100. The address enable and data enable are both active low signals; when the address enable is low, the synchronizer 100 sends an address value to each channel unit. The address value here refers to the number assigned to each STM-n/2M channel unit (priority is set) through the microcomputer unit 5 for supply of the timing source. Using this address value, the synchronizer 100 identifies the timing source by which the data on the address/data bus is timed.

For example, as shown in FIG. 6, the address value "0001" is output when the synchronizer 100 has received the SSMB value of the channel unit for which priority 1 is set. When this address is received, the channel unit of priority 1 sends the SSMB value of the received S1 byte to the synchronizer 100 by inserting it into the next time slot SSMB1 when the data enable is low. In the case of a 2 M channel unit, a user-set SSMB value is output.

Further, as shown in FIG. 6, when the most significant bit (x) of the address value is "0", the channel units assigned the respective priority levels send the four-bit SSMB values received from the respective external line to the synchronizer 100 by inserting them into the subsequent time slots SSMB1 to SSMB3 respectively when the data enable is low. On the other hand, when the most significant bit (x) of the address value is "1", the synchronizer 100 sends the SSMB value of the currently selected timing source to each channel unit by inserting it into the next time slot SSMB4 when the data enable is low. In this way, the SSMB information is transmitted and received repeatedly with a format period defined by the vertical dashed lines in FIG. 5 by using the so-called polling selecting method.

For example, when the timing source of priority 1 is currently selected, the synchronizer 100 outputs the address value "1001". The STM-n channel unit that received this address value compares it with its own priority set value, and if the priority set value is 1 ("x001") (that is, if the two values match), the SSMB value of the S1 byte to be output on the transmission line is changed to "1111" to prevent the occurrence of a timing loop between opposing networks or network elements. When they do not match, the received SSMB value in SSMB4 is transmitted as the S1 byte onto the transmission line. In the case of the 2 M channel units, nothing is done since they do not have the function of sending SSMB values on the transmission line.

FIG. 7 is a diagram showing an SSMB code/bit assignment table (ITU-T G.708).

In FIG. 7, the meaning of each SSMB code is defined; for example, the SSMB value "0010" means a synchronization quality equivalent to that of a cesium atomic oscillator used as an external clock, SSMB value "0100" a synchronization quality equivalent to that of a rubidium atomic oscillator, and SSMB value "1011" a synchronization quality equivalent to that of a SETS. This four-bit SSMB information is transmitted and received during the low level period of the data enable.

Here, the SSMB value itself is simply a binary code defined by ITU-U G.708, as described above. It is therefore necessary to develop criteria for evaluating the synchronization quality that matches the meaning of each SSMB code.

FIG. 8 shows one example of an SSMB value quality list developed for such purposes. In this example, the synchronization quality increases as the quality value decreases, the quality value 2 indicating the highest synchronization quality and the quality value 6 the lowest synchronization quality.

The synchronizer 100 has an SSMB code table and, for each address, a quality list (quality value) is set by the microcomputer unit 5. The binary codes shown side by side in the center of FIG. 8 indicate this. For example, when the received SSMB value is "0010", the synchronizer 100 refers to the SSMB code table and confirms that its corresponding address is "02h". Then, the synchronizer 100 obtains the corresponding quality value "2". In this way, a conversion from the SSMB value to the quality value is performed in the synchronizer 100. As can be seen from FIG. 8, different SSMB codes may be assigned the same quality value. If a plurality of SSMB codes are found to have the same quality value as a result of the conversion, the SSMB code of the highest priority is selected.

Figure 9:
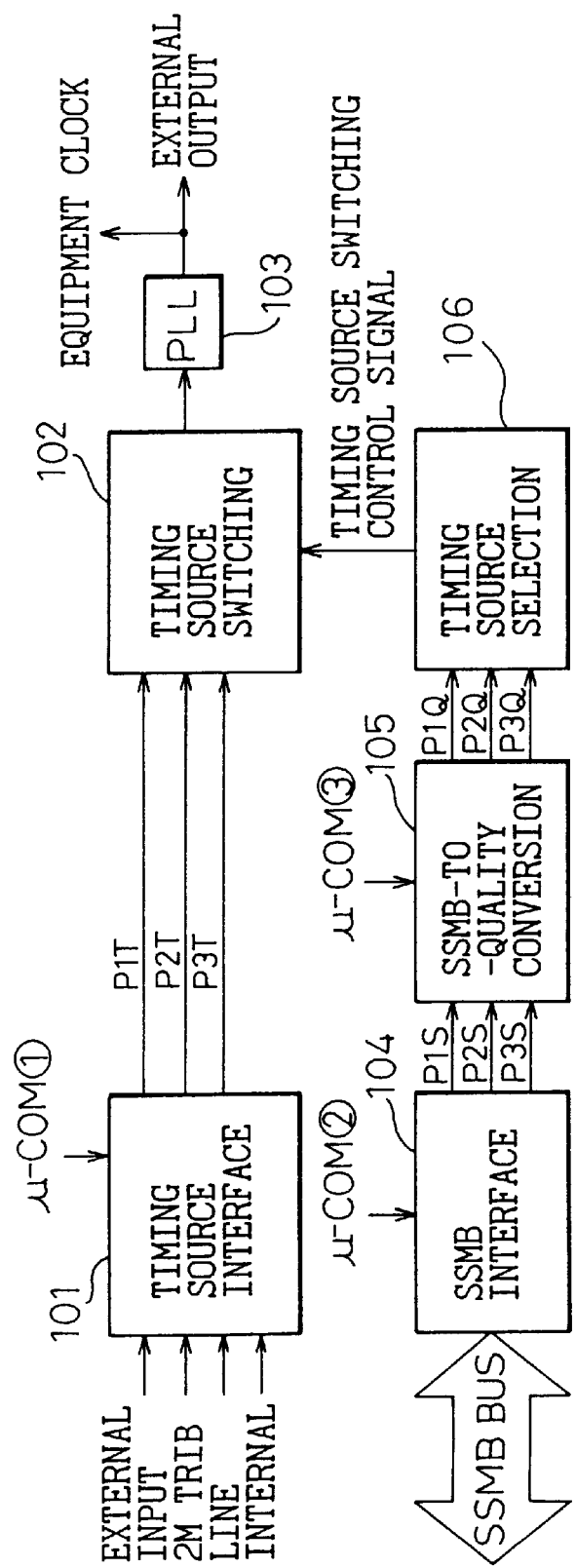
FIG. 9 is a block diagram showing the basic configuration of a synchronization controller.

FIG. 9 is a block diagram showing the basic configuration of a synchronization controller specifically designed to perform synchronization control in the synchronizer 100 of FIG. 4.

Before describing the embodiments of the present invention, the basic block configuration of the synchronization controller fundamental to the present invention will be described first. Since the general operation of the synchronization controller of FIG. 9 is apparent from the above explanation of the synchronizer 100, the following description focuses on each block of the synchronization controller as related to the above explanation.

In FIG. 9, the four kinds of timing sources shown in FIG. 4, i.e., Internal Input, 2 M Tributary, STM-n (Line), and External Input, are input to a timing source interface section 101. Here, the four kinds of timing sources are all given as standard 2 M interface signals (2.048 MHz).

The timing source interface section 101 sets priority information for each timing source in accordance with a user-set instruction ($\mu$-COM①) from the microcomputer unit 5. In the illustrated example, a maximum of three timing sources (P1T, P2T, P3T) with priority appended thereto are selected from among the four timing sources. Here, P1T, for example, indicates the timing source of priority 1.

Next, in accordance with an instruction from a timing source selection section 106 described subsequently, a timing source switching section 102 selects one of the three timing sources (P1T, P2T, P3T) and supplies the selected one to a PLL section 103 at the next stage. The PLL section synchronizes the equipment clock, to be distributed within the equipment, to the selected timing source, and outputs it through an external output as a synchronization clock for other network, switching equipment, etc. that do not support SSMB.

An SSMB interface section 104 provides an interface with the SSMB bus shown in FIG. 5. In accordance with priority information ($\mu$-COM②) signaled by an instruction from the microcomputer unit 5, the SSMB interface section 104 selects the corresponding SSMB information (P1S, P2S, P3S). The priority information ($\mu$-COM②) here refers to the information of the timing source priority set by the user. P1S, for example, indicates the SSMB value (SSMB1 in FIG. 5) of priority 1 selected by the user.

An SSMB-to-quality conversion section 105, in accordance with quality list setting information ($\mu$-COM③) signaled by an instruction from the microcomputer unit 5, converts the SSMB values (P1S, P2S, P3S) selected by the SSMB interface section 104 into the corresponding quality values (P1Q, P2Q, P3Q), as explained with reference to FIG. 8. Here, P1Q, for example, refers to the data obtained by converting P1S to the corresponding quality value.

The timing source selection section 106 compares the quality values (P1Q, P2Q, P3Q) supplied from the SSMB-to-quality conversion section 105, selects the highest quality value, and instructs the timing source switching section 102 to switch to select the timing source having the highest quality value. If there are a plurality of SSMBs having the same quality value, the SSMB with the highest priority is preferentially selected.

Figure 10:
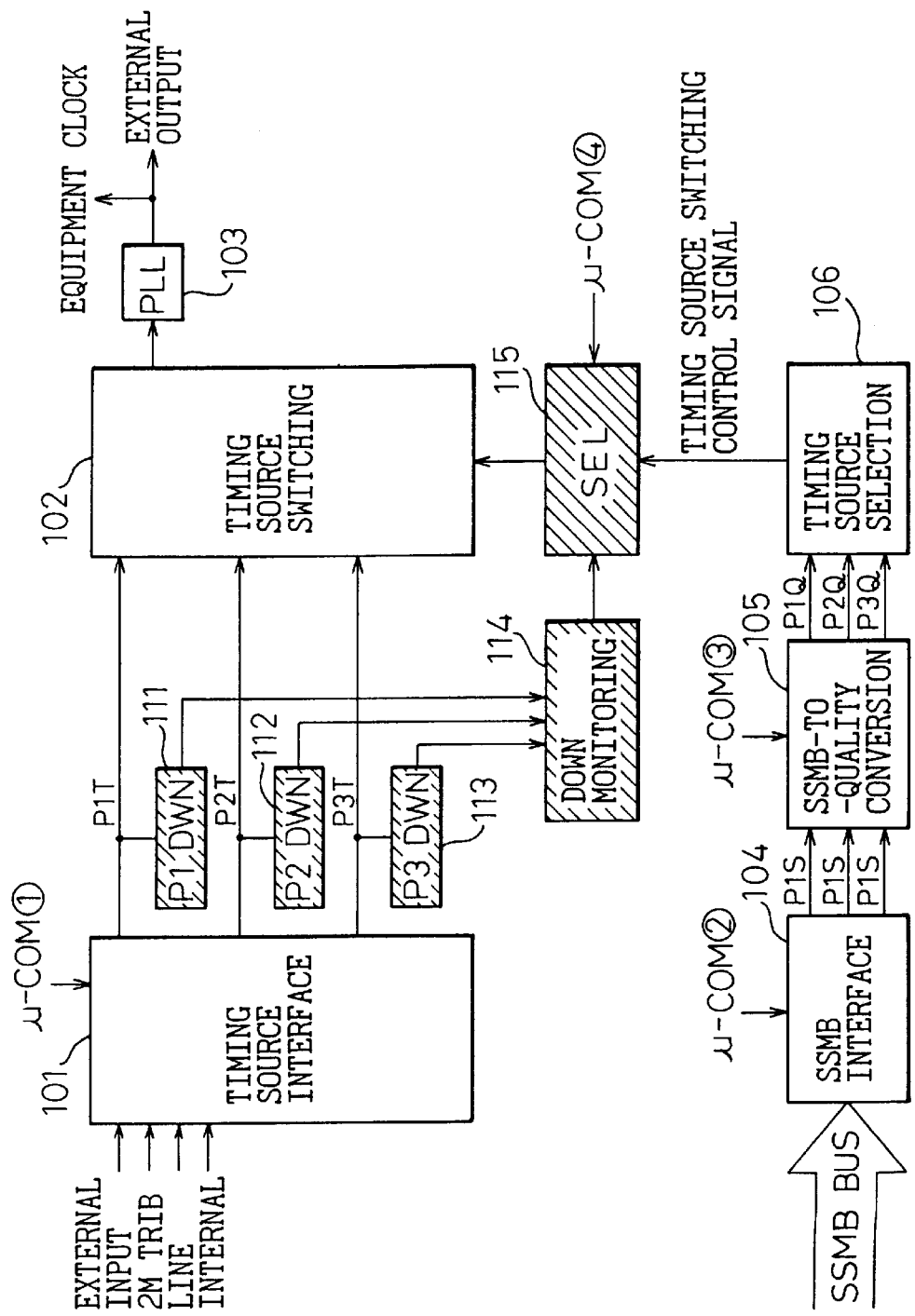
FIG. 10 is a diagram showing a first embodiment of the synchronization equipment according to the present invention.

FIG. 10 shows a first embodiment of the synchronization equipment according to the present invention. Throughout the figures illustrating the embodiments hereinafter given, parts already explained are designated by like reference numerals and no further explanation of such parts will be given.

In FIG. 10, failure detection sections 111 to 113, a failure monitoring section 114, and a mode selection section 115 are added to the basic configuration of the synchronization controller shown in FIG. 9.

The failure detection section 111 to 113 respectively detect a clock down condition of the timing source signals (P1T, P2T, P3T), respectively corresponding to the priority levels 1, 2, and 3, supplied from the timing source interface section 101. The failure monitoring section 114 monitors each timing source signal for the occurrence of a clock down, selects the highest priority signal (priority 1>priority 2>priority 3) from among the normal timing source signals other than the timing source signal that went down, and supplies a switching control signal to the mode selection section 115.

In accordance with a user-set instruction ($\mu$-COM④) from the microcomputer unit 5 signaling whether the mode is the "mode that uses SSMB" or "mode that does not use SSMB", the mode selection section 115 determines whether the switching control signal from the failure monitoring section 114 should be supplied to the timing source switching section 102 (when the "mode that does not use SSMB" is specified) or the timing source switching control signal based on the SSMB information from the timing source selection section 106 should be supplied to it as in the case of FIG. 9 (when the "mode that uses SSMB" is specified).

With the provision of the two modes, i.e., the "mode that uses SSMB" and the "mode that does not use SSMB", even when an SSMB value cannot be obtained from the timing reference side a synchronization network can be established for the downstream network by using the latter mode. Further, for the downstream network, elements, etc. that support SSMB, in the event of a failure of any timing source signal (P1T, P2T, P3T) the corresponding SSMB value can be added and transmitted. Accordingly, when the present invention is applied to the equipment (NE5, etc.) shown by dots in FIGS. 2A and 2B, synchronization can be established throughout the entire network. Here, the setting of the two modes can be easily implemented by modifying the firmware within the equipment.

FIGS. 11A and 11B show one example of the circuit configuration of each of the failure detection sections 111 to 113 of FIG. 10. FIG. 11A is a circuit diagram, and FIG. 11B is a main timing chart.

In FIG. 11A, two D-type flip-flop circuits (FF-A and FF-B) 212 and 213 are both reset when the reset signal (RESET) goes low. When the reset signal is high, a timer signal (Timer) for detecting a clock down condition, or an instantaneous cutoff of a clock signal that lasts for a prescribed time (T) or longer, is applied via an AND gate circuit 211 to the set terminal of the first-stage flip-flop circuit 212 whose output Q is thus set high.

During the period when a normal clock signal is being applied to the flip-flop circuit 212, since the above Q output is set low at the next rising edge of the clock signal, the output of the second-stage flip-flop circuit 213 remains low (no alarm). If the clock signal off condition lasts for the timer signal period (T) or longer, the output Q of the second-stage flip-flop circuit 213 is set high (an alarm condition) by the next timer signal pulse.

Figure 12A:
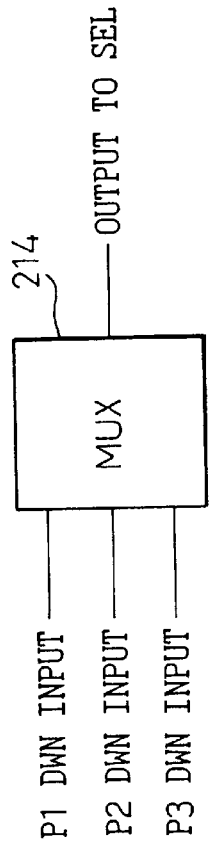
FIG. 12A is a diagram showing one example of the circuit configuration of a failure monitoring section.
Figure 12B:
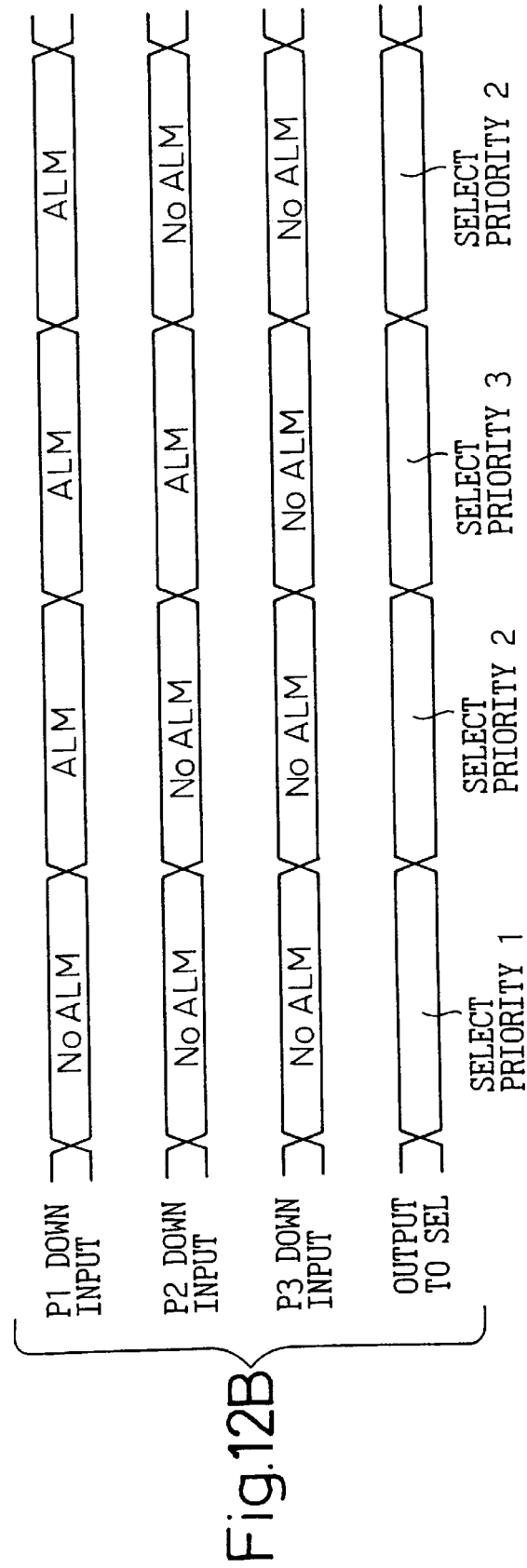
FIG. 12B is a timing chart for FIG. 12A.

FIGS. 12A and 12B show one example of the circuit configuration of the failure monitoring section 114 of FIG. 10. FIG. 12A is a circuit diagram, and FIG. 12B is a main timing chart.

The concentrator circuit (MUX) 214 shown in FIG. 12A is constructed from a so-called 3-1 selector circuit with priority. Therefore, as shown in FIG. 12B, when a clock down condition is not detected by any of the failure detection sections 111 to 113, a selection signal of priority 1 is supplied to the mode selection section (SEL) 115. When a clock down occurs, a selection signal to select the higher priority signal between the normal clocks is output.

Figure 13A:
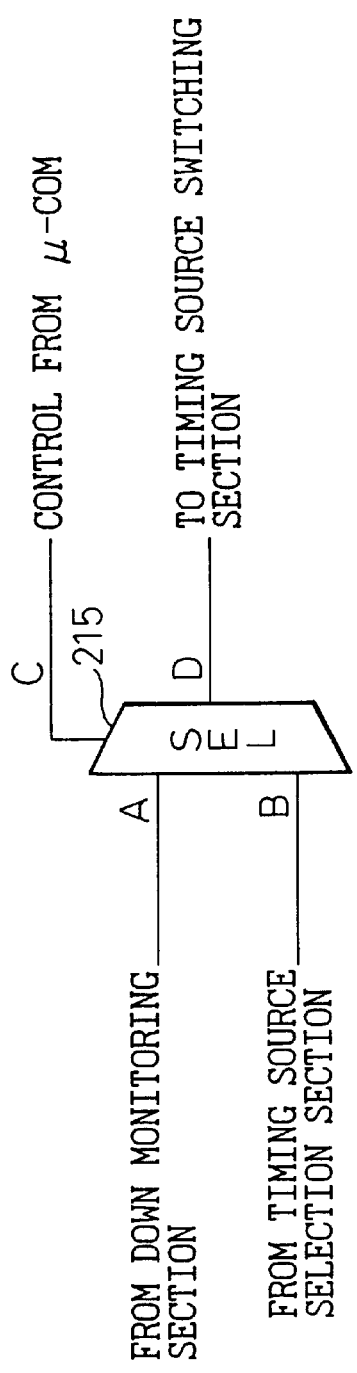
FIG. 13A is a diagram showing one example of the circuit configuration of a mode selection section.
Figure 13B:
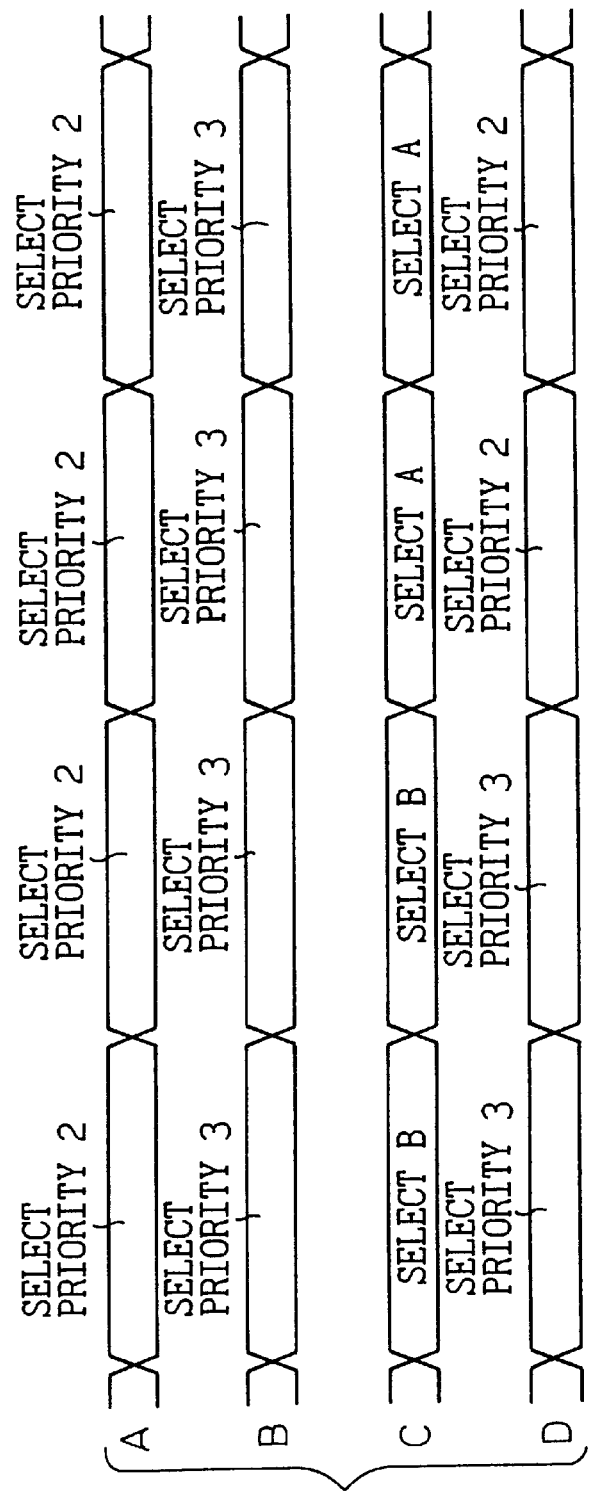
FIG. 13B is a timing chart for FIG. 13A.

FIGS. 13A and 13B show one example of the circuit configuration of the mode selection section 115 of FIG. 10. FIG. 13A is a circuit diagram, and FIG. 13B is a main timing chart.

The selector (SEL) 215 shown in FIG. 13A selects either the selection signal A from the failure monitoring section 114 or the timing source switching control signal B from the timing source selection section 106. The instruction signal ($\mu$-COM④) from the microcomputer unit 5 specifying the "mode that uses SSMB" or the "mode that does not use SSMB" is used as the selection signal C for the above selection, as shown in FIG. 13B.

Figure 14:
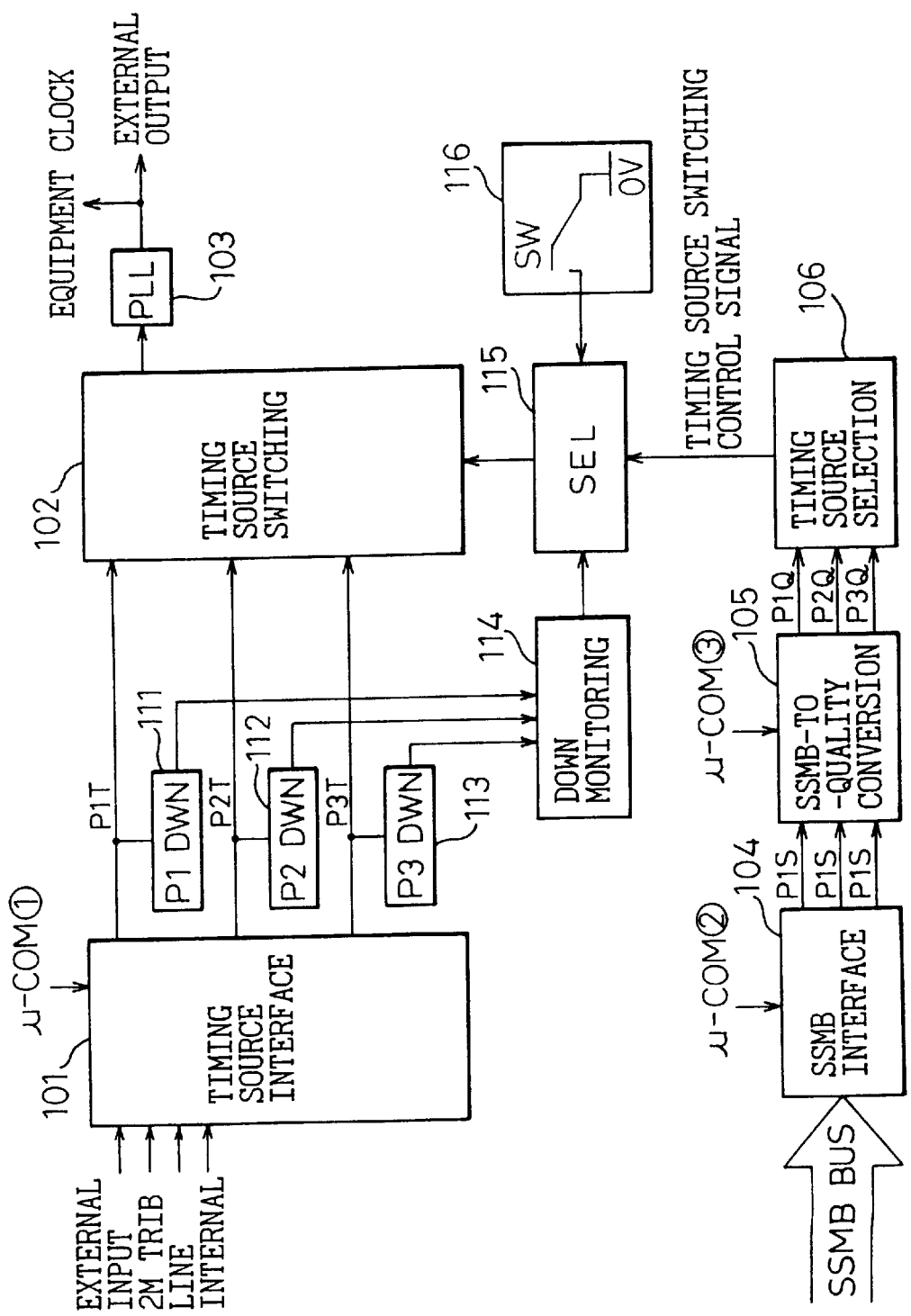
FIG. 14 is a diagram showing a second embodiment of the synchronization equipment according to the present invention.

FIG. 14 shows a second embodiment of the synchronization equipment according to the present invention.

In the first embodiment shown in FIG. 10, the instruction signal ($\mu$-COM④) from the microcomputer unit 5 was used as the selection signal for the mode selection section 115. On the other hand, in the present embodiment shown in FIG. 14, the instruction signal specifying the "mode that uses SSMB" or the "mode that does not use SSMB" is not given using $\mu$-COM④, but the selection is made directly by the user using a manual switch 116.

The purpose of the present embodiment is based on the judgement that in the construction of a network the need to set the mode to use SSMB or not use SSMB may arise only once, or may not arise at all, during the lifetime of the equipment, and therefore that user setting by using a switch mechanism will suffice for the purpose and it will not be necessary to go so far as to modify the firmware as in the first embodiment.

Figure 15:
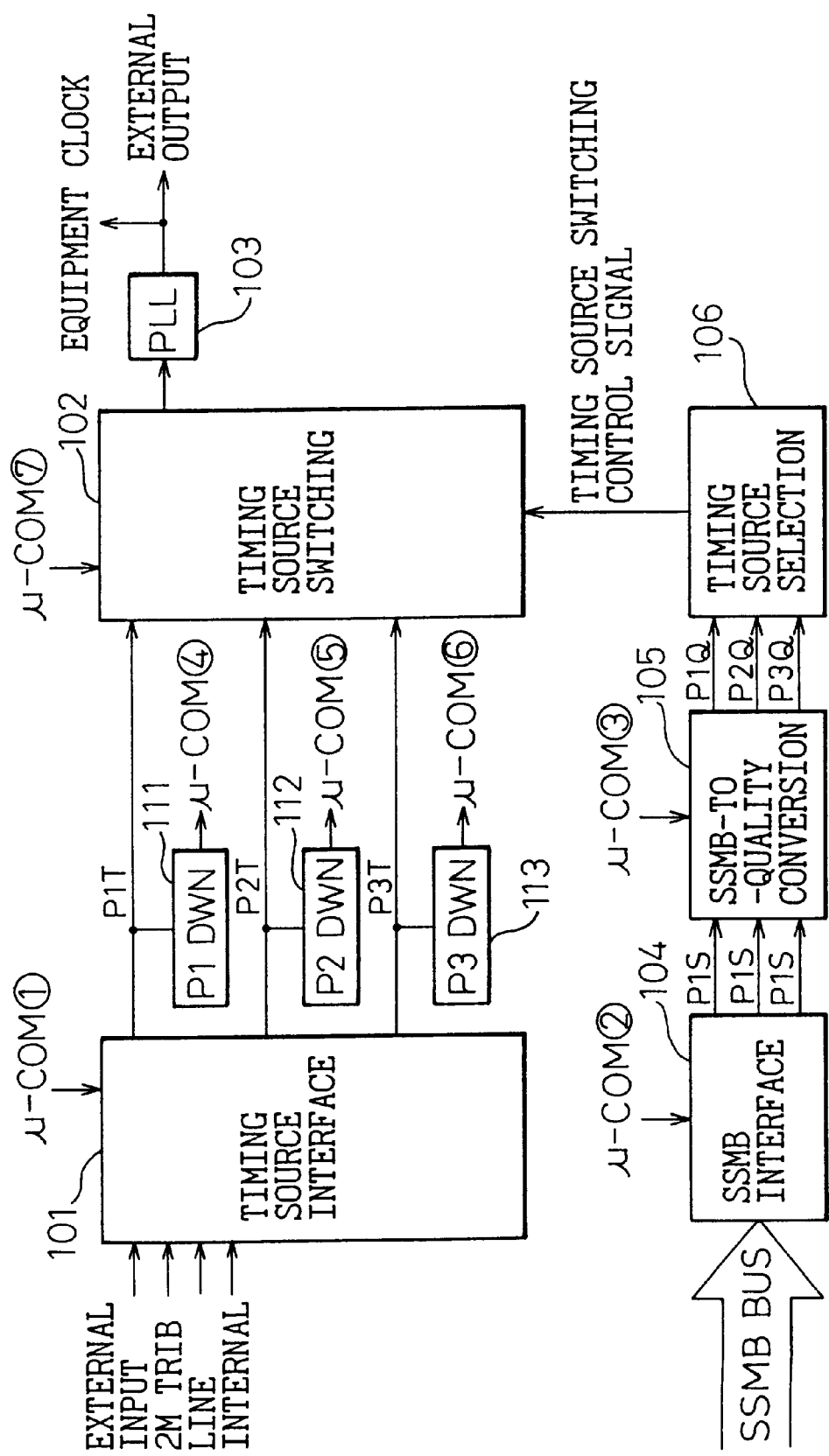
FIG. 15 is a diagram showing a third embodiment of the synchronization equipment according to the present invention.

FIG. 15 shows a third embodiment of the synchronization equipment according to the present invention.

In FIG. 15, the signals from the failure detection sections 111 to 113 in the first embodiment of FIG. 10 are supplied as failure detection information ($\mu$-COM④ to $\mu$-COM⑥) directly to the microcomputer unit 5. SDH equipment inherently incorporates a function for forcefully switching the timing source (Force function), and the timing source switching is made by using the Force function from the microcomputer unit 5. The Force function is usually used for maintenance purposes; in the present embodiment, a failure of priority 1/2/3 is monitored by firmware and, based on the obtained information, forced switching is performed in accordance with the priority order of priority 1>priority 2>priority 3.

Figure 16:
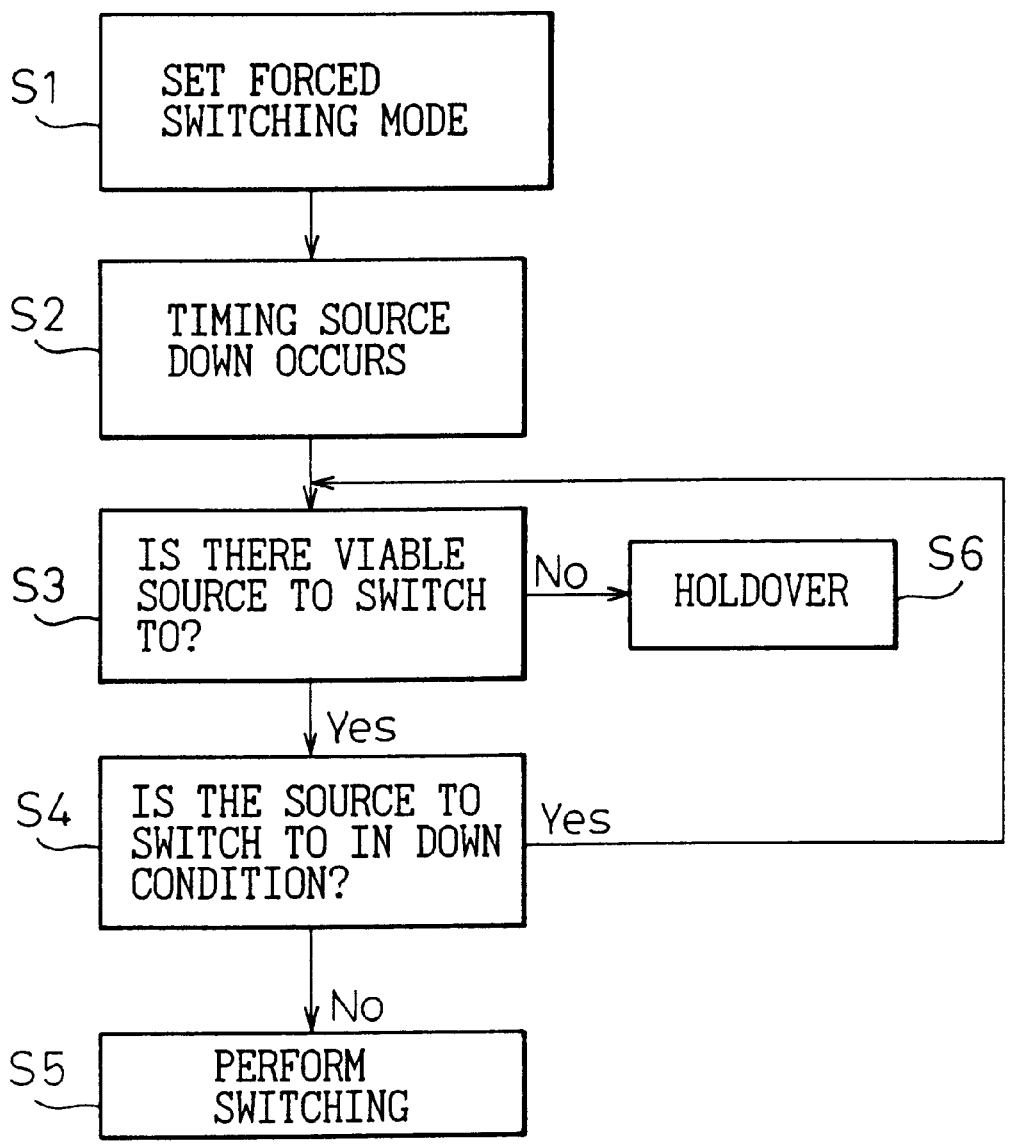
FIG. 16 is a diagram showing a forced switching flow.

FIG. 16 shows an example of a forced switching flow according to the embodiment of FIG. 15.

In FIG. 16, first a forced switching mode is set in step S1. In this mode, firmware monitors P1, P2, and P3 for a clock down condition, and based on the obtained information, forced switching control (Force) is performed on the timing source switching section 102. In step S2, the occurrence of a timing source failure is determined based on the failure detection information ($\mu$-COM④ to $\mu$-COM⑥) from the failure detection sections 111 to 113.

In step S3, it is determined whether there remains a viable timing source to switch to; if all the timing sources are down, the holdover mode is entered (step S6). Holdover is the function to retain the accuracy of the last selected timing source. This function is used when the timing source to be selected is lost. In step S4, the timing source to switch to is checked for a failure. For example, if the timing source of priority 1 is down, then it is checked whether or not the timing source of priority 2 is in a clock down condition. Next, in step S5, forced switching (Force) is performed.

Figure 17:
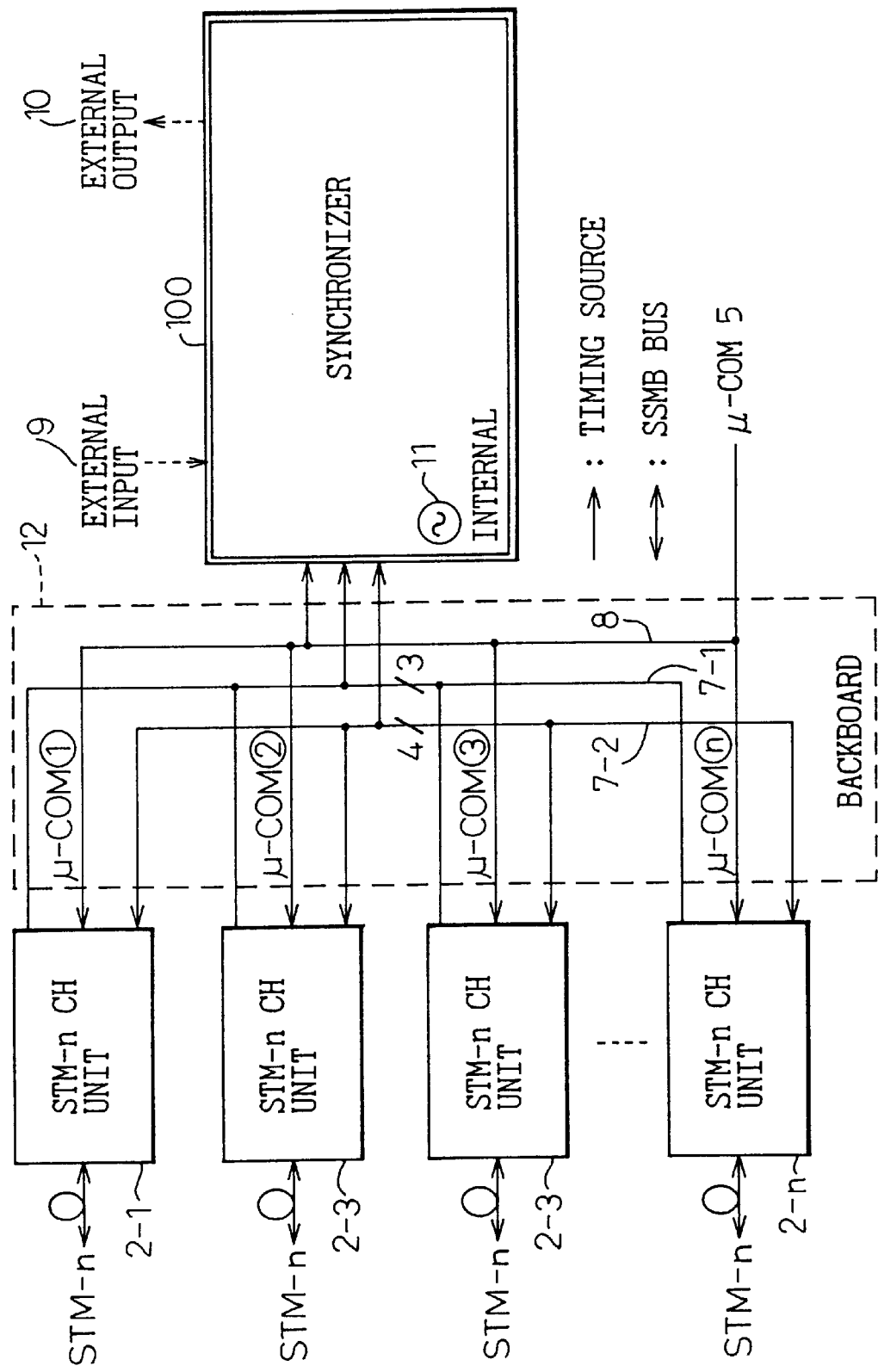
FIG. 17 is a diagram showing a fourth embodiment of the synchronization equipment according to the present invention.

FIG. 17 shows a fourth embodiment of the synchronization equipment according to the present invention.

In FIG. 17, the SSMB values to be sent to the synchronizer 100 are set in the respective STM-n channel units as user-set information ($\mu$-COM①, ②, ...) from the microcomputer unit 5, to realize the SSMB function. With this setting, NE5 shown in FIG. 2B becomes operable as an SSMB-supporting element even when SSMB information is not given from the upstream NE4.

Figure 18A:
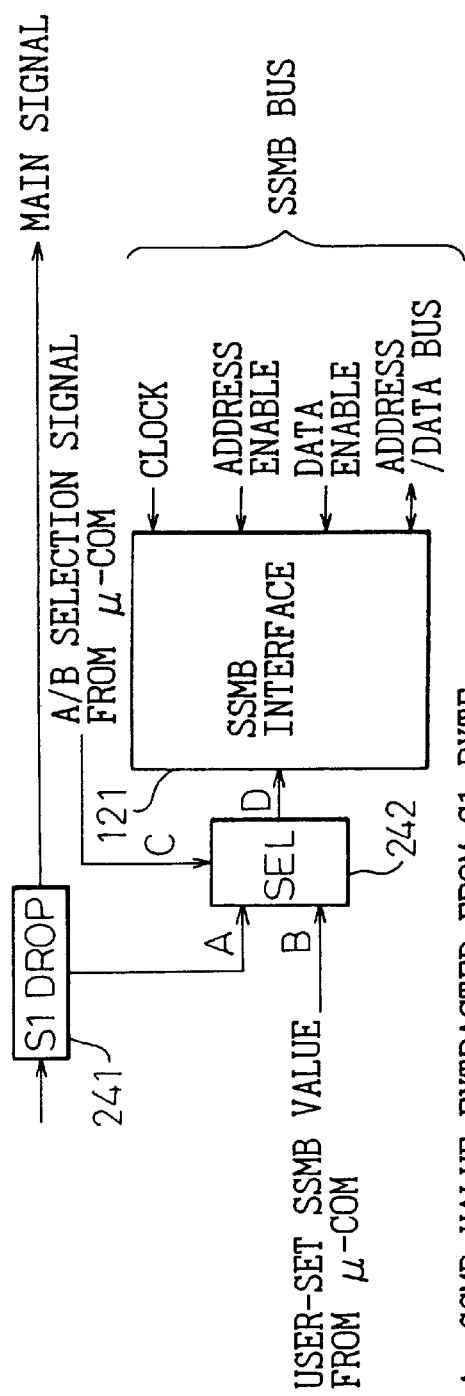
FIG. 18A is a diagram showing an example of the circuit configuration of an SSMB interface section at an STM-n channel unit that implements the fourth embodiment.
Figure 18B:
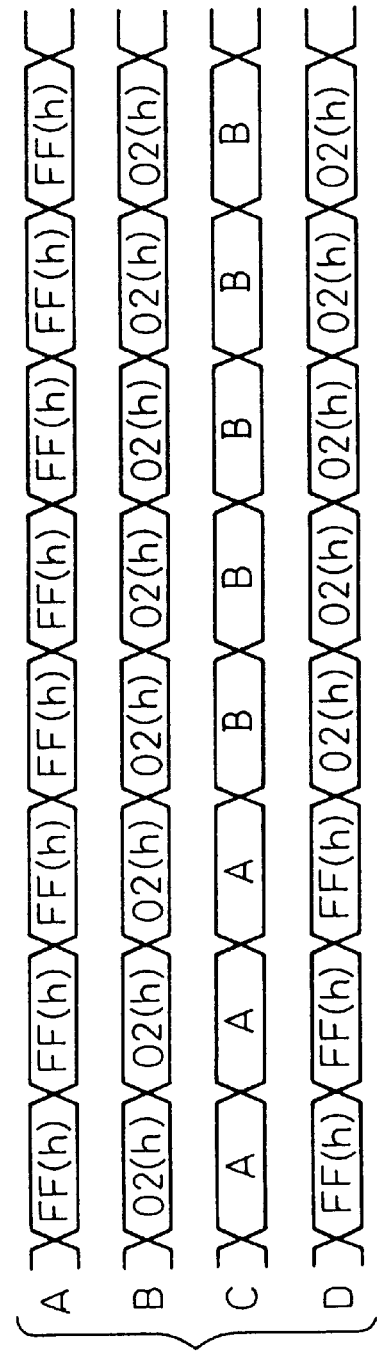
FIG. 18B is a timing chart for FIG. 18A.

FIGS. 18A and 18B show an example of the circuit configuration of an SSMB interface section at an STM-n channel unit that implements the fourth embodiment.

FIG. 18A is a circuit diagram, and FIG. 18B is a main timing chart.

In FIG. 18A, the SSMB interface section 121 is similar in function to the SSMB interface section 104 at the synchronization controller explained with reference to FIG. 9, and no further explanation will be given here. In the case of an SSMB-supporting STM-n channel unit, the S1 byte contained in the multiplex section overhead (MSOH) of the main signal is extracted by an S1 drop section 241, and its SSMB information is fed to the SSMB interface section 121. The SSMB interface section 121 supplies the SSMB information to its opposing SSMB interface section 104 at the synchronizer 100 side as shown in FIGS. 4 and 5.

In the present embodiment, there is further provided a selector (SEL) 242, whose one input A is supplied with the SSMB information from the S1 drop section 241, and whose other input B is supplied with the SSMB information ($\mu$-COM①, ②, ...) set by the user via the microcomputer unit 5. The microcomputer unit 5 also controls the switching of the selector 242 by applying the selection signal C so that the selector 242 selects the input A when the upstream element or network supports SSMB and the input B when it does not support SSMB.

As a result, when the upstream element or network does not support SSMB (the S1 byte is "1111 (FFh)"), the SSMB information (02h) set by the microcomputer unit 5 is sent to the synchronizer 110 from the moment the input B is selected, as shown in FIG. 18B.

FIG. 19 shows a fifth embodiment of the synchronization equipment according to the present invention.

According to the foregoing fourth embodiment, an SSMB-supporting element can now successfully connect to a network or element that does not support SSMB. However, as shown in FIG. 2A, the SSMB-supporting element (shown by dots) must accurately insert the SSMB information in the S1 byte in the multiplex section overhead (MSOH) for transmission to the downstream SSMB-supporting element.

To accomplish this, in FIG. 19, the user-set SSMB value (μ-COM⑤) from the microcomputer unit 5 is supplied to the SSMB interface section 104 at the synchronizer 100 side.

FIGS. 20A and 20B show an example of the circuit configuration of the SSMB interface section 104 at the synchronizer 100 side that implements the fifth embodiment. FIG. 20A is a circuit diagram, and FIG. 20B is a main timing chart.

In FIG. 20A, the SSMB interface section 104 consists of a bus controller (BUS CONTROL) 251 for controlling signals on the SSMB bus and a selector (SEL) 252. The bus controller 251 performs the operation of the SSMB interface section 104 explained with reference to FIGS. 5 and 9. In the present embodiment, however, the SSMB information (SSMB4 in FIG. 5) to be sent from the synchronizer 100 to each channel unit is supplied via the selector 252.

The SSMB value of the currently selected timing source, the same one as that explained with reference to FIG. 5, is applied to one input A of the selector 252. To the other input B is applied the user-set SSMB value described above. Using the user-set selection control signal C from the microcomputer unit 5, the input A is selected when the upstream element is one that supports SSMB and the input B is selected when it does not support SSMB.

FIG. 20B shows an example of the case in which the upstream element does not support SSMB (the S1 byte is "1111 (FFh)". As shown, from the moment the input B is selected, the SSMB information (02h) set by the microcomputer unit 5 is sent to each channel unit as the SSMB value in SSMB4 shown in FIG. 5.

FIG. 21 shows a sixth embodiment of the synchronization equipment according to the present invention.

In the foregoing fifth embodiment, the SSMB information to be output on the line side of each channel unit was supplied from the synchronizer 100; in contrast, in the present embodiment, SSMB information directly set in each channel unit is output on its line side. In FIG. 21, user-set information (μ-COM①, ②, ...) from the microcomputer unit 5 is set in the respective STM-n channel units as the SSMB values which are output from the respective channel units onto their STM-n lines. This enables the element shown by dots in FIG. 2A to supply the SSMB information to the downstream element.

FIGS. 22A and 22B show an example of the circuit configuration of the SSMB interface section at the STM-n channel unit side that implements the sixth embodiment. FIG. 22A is a circuit diagram, and FIG. 22B is a main timing chart.

In FIG. 22A, the SSMB interface section 121 is similar in function to the SSMB interface section 104 at the synchronization controller explained with reference to FIG. 9, and no further explanation will be given here. The SSMB value (SSMB4 in FIG. 4) extracted from the SSMB bus by the SSMB interface section 121 is applied to the input A of the selector (SEL) 262 at the next stage. The other input B is supplied with the user-set SSMB information (μ-COM①, ②, ...) from the microcomputer unit 5.

The microcomputer unit 5 also controls the switching of the selector 262 by applying the selection signal C so that the selector 262 selects the input A when the upstream element or network supports SSMB and the input B when it does not support SSMB. The output of the selector 262 is supplied to an S1 insertion section (S1 INS) 261 placed in the main signal line transmission path, and is set as the SSMB information of the S1 byte in the multiplex section overhead (MSOH) of the main signal for output on the line side for transmission to other SSMB-supporting element or network.

FIG. 22B shows an example of the case in which the upstream element does not support SSMB (the S1 byte is "1111 (FFh)". As shown, from the moment the input B is selected, the SSMB information (02h) set by the microcomputer unit 5 is sent from the channel unit onto the STM-n line.

As described above, by using the synchronization equipment of the present invention, a synchronization system can be easily established with a network or SDH element that does not support SSMB.

Furthermore, according to the present invention, a connection can be easily established between a network that does not support SSMB and a network that supports SSMB.

Accordingly, for the user, an existing network where SSMB-nonsupporting SDH elements and SSMB-supporting elements purchased from different manufacturers are mixed can be easily constructed into a synchronous network.

What is claimed is:

1. Synchronization equipment comprising:
   a timing source interface section for interfacing with multiple kinds of timing sources;
   a timing source switching section for outputting one timing source by switching its input between a plurality of timing sources which have been selected in said timing source interface section and assigned prescribed priority;
   a PLL section for generating an equipment clock by synchronizing to the timing source selected and output from said timing source switching section;
   a failure detection section for detecting a failure of each of said plurality of timing sources assigned said prescribed priority;
   a failure monitoring section for monitoring failure detection information from said failure detection section, and for outputting in the event of detection of a timing source failure a timing source switching control signal directing switching to a timing source having the highest priority among the timing sources other than the failure-detected timing source;
   an SSMB interface section for interfacing with an SSMB bus;
   an SSMB-to-quality conversion section for converting SSMB information supplied from said SSMB interface section into corresponding synchronization quality information;
   a timing source selection section for outputting a timing source switching control signal based on the synchronization quality information supplied from said SSMB-to-quality conversion section; and
   a selection section for selecting either the timing source switching control signal from said failure monitoring section or the timing source switching control signal from said timing source selection section in accordance with an instruction from prescribed selection instruction means.

2. Synchronization equipment according to claim 1, wherein said prescribed selection instruction means is an equipment controller that controls equipment operation.

3. Synchronization equipment according to claim 1, wherein said prescribed selection instruction means is constructed from a manually operated switch mechanism.

4. Synchronization equipment comprising:
   a timing source interface section for interfacing with multiple kinds of timing sources;
   a timing source switching section for outputting one timing source by switching its input between a plurality of timing sources which have been selected in said timing source interface section and assigned prescribed priority;

a PLL section for generating an equipment clock by synchronizing to the timing source selected and output from said timing source switching section;

a failure detection section for detecting a failure of each of said plurality of timing sources assigned said prescribed priority;

an SSMB interface section for interfacing with an SSMB bus;

an SSMB-to-quality conversion section for converting SSMB information supplied from said SSMB interface section into corresponding synchronization quality information; and a timing source selection section for outputting a timing source switching control signal based on the synchronization quality information supplied from said SSMB-to-quality conversion section, and for controlling the switching operation of said timing source switching section, and wherein:

failure information from said failure detection section being reported to an equipment controller that controls equipment operation and, by using an existing Force function incorporated in said equipment, said equipment controller performs timing source switching control even in the absence of SSMB information.

5. Synchronization equipment comprising:

a synchronizer comprising a timing source interface section for interfacing with multiple kinds of timing sources, a timing source switching section for outputting one timing source by switching its input between a plurality of timing sources which have been selected in said timing source interface section and assigned prescribed priority, a PLL section for generating an equipment clock by synchronizing to the timing source selected and output from said timing source switching section, a failure detection section for detecting a failure of each of said plurality of timing sources assigned said prescribed priority, an SSMB interface section for interfacing with an SSMB bus, an SSMB-to-quality conversion section for converting SSMB information supplied from said SSMB interface section into corresponding synchronization quality information, and a timing source selection section for outputting a timing source switching control signal based on the synchronization quality information supplied from said SSMB-to-quality conversion section, and for controlling the switching operation of said timing source switching section; and an STM-n channel unit, connected to a transmission line, for communicating SSMB information with said synchronizer, and wherein:

an SSMB value to be sent to said STM-n channel unit from said synchronizer is set by an equipment controller controlling equipment operation, thereby enabling said STM-n channel unit to send an arbitrary SSMB value out onto said transmission line.

6. Synchronization equipment according to claim 5, wherein, instead of setting the SSMB value, to be sent to said STM-n channel unit from said synchronizer by said equipment controller controlling equipment operation, the SSMB value to be sent out from said STM-n channel unit that is outputting said SSMB information onto said transmission line is set by said equipment controller, thereby enabling said STM-n channel unit to send an arbitrary SSMB value out onto said transmission line.

7. Synchronization equipment comprising:

a synchronizer comprising a timing source interface section for interfacing with multiple kinds of timing sources, a timing source switching section for outputting one timing source by switching its input between a plurality of timing sources which have been selected in said timing source interface section and assigned prescribed priority, a PLL section for generating an equipment clock by synchronizing to the timing source selected and output from said timing source switching section, a failure detection section for detecting a failure of each of said plurality of timing sources assigned said prescribed priority, an SSMB interface section for interfacing with an SSMB bus, an SSMB-to-quality conversion section for converting SSMB information supplied from said SSMB interface section into corresponding synchronization quality information, and a timing source selection section for outputting a timing source switching control signal based on the synchronization quality information supplied from said SSMB-to-quality conversion section, and for controlling the switching operation of said timing source switching section; and a channel unit, connected to a transmission line, for communicating SSMB information with said synchronizer, and wherein:

the SSMB information to be sent from said channel unit to said synchronizer is set by an equipment controller controlling equipment operation, thereby performing said timing source switching control.

8. Synchronization equipment comprising:

a timing source interface section for interfacing with multiple kinds of timing sources;

a timing source switching section for outputting one timing source by switching its input between a plurality of timing sources which have been selected in said timing source interface section and assigned prescribed priority;

a PLL section for generating an equipment clock by synchronizing to the timing source selected and output from said timing source switching section;

a failure detection section for detecting a failure of each of said plurality of timing sources assigned said prescribed priorities; and a failure monitoring section for monitoring failure detection information from said failure detection section, and for instructing, in the event of detection of a timing source failure, said timing source switching section to switch to a timing source having the highest priority among the timing sources other than the failure-detected timing source.

9. Synchronization equipment comprising:

a timing source interface section for interfacing with multiple kinds of timing sources;

a timing source switching section for outputting one timing source by switching its input between a plurality of timing sources which have been selected in said timing source interface section and assigned prescribed priorities;

a PLL section for generating an equipment clock by synchronizing to the timing source selected and output from said timing source switching section; and a failure detection section for detecting a failure of each of said plurality of timing sources assigned said prescribed priorities, and wherein:

failure information from said failure detection section is reported to an equipment controller that controls equipment operation, and said equipment controller performs timing source switching control by using an existing Force function incorporated in said equipment.

10. Synchronization equipment comprising:

a synchronizer for performing synchronization control;

a channel unit for communicating SSMB information with said synchronizer and sending an SSMB value onto a transmission line;

a selector, to which an SSMB value output by said synchronizer and an SSMB value arbitrarily set by a user are provided, for outputting either one of said SSMB values to said channel unit; and a controller for determining whether the preceding synchronization equipment, on which synchronization depends, supports an SSMB or not, and controlling said selector to output said arbitrary SSMB value set by the user if said synchronization equipment does not support an SSMB.

11. Synchronization equipment comprising:

a synchronizer for performing synchronization control;

a channel unit for communicating SSMB information with said synchronizer and sending an SSMB value onto a transmission line;

a selector, to which an SSMB value output by said channel unit and an SSMB value arbitrarily set by a user are provided, for outputting either one of said SSMB values to said transmission line; and a controller for determining whether the preceding synchronization equipment, on which synchronization depends, supports an SSMB or not, and controlling said selector to output said arbitrary SSMB value set by the user if said synchronization equipment does not support an SSMB.

12. Synchronization equipment comprising:

a synchronizer for performing synchronization control;

a channel unit for communicating SSMB information with said synchronizer, a selector, to which an SSMB value output by said channel unit and an arbitrary SSMB value set by a user are provided, for outputting either one of said SSMB values to said synchronizer; and a controller for determining whether the preceding synchronization equipment, on which synchronization depends, supports an SSMB or not, and controlling said selector to output said arbitrary SSMB value set by the user if said synchronization equipment does not support an SSMB.

* * * * *